US012490108B2

(12) United States Patent
Sevindik et al.

(10) Patent No.: US 12,490,108 B2
(45) Date of Patent: Dec. 2, 2025

(54) APPARATUS AND METHODS FOR SPATIAL AND OPERATIONAL DIFFERENTIATION AND OPTIMIZATION IN A WIRELESS SYSTEM

(71) Applicant: Charter Communications Operating, LLC, St. Louis, MO (US)

(72) Inventors: Volkan Sevindik, Parker, CO (US); Haider Syed, Parker, CO (US)

(73) Assignee: CHARTER COMMUNICATIONS OPERATING, LLC, St. Louis, MO (US)

( * ) Notice: Subject to any disclaimer, the term of this patent is extended or adjusted under 35 U.S.C. 154(b) by 0 days.

(21) Appl. No.: 18/377,479

(22) Filed: Oct. 6, 2023

(65) Prior Publication Data
US 2024/0048997 A1 Feb. 8, 2024

Related U.S. Application Data

(63) Continuation of application No. 17/902,874, filed on Sep. 4, 2022, now Pat. No. 11,785,474, which is a
(Continued)

(51) Int. Cl.
*H04W 16/14* (2009.01)
*H04W 8/26* (2009.01)
(Continued)

(52) U.S. Cl.
CPC ............ *H04W 16/14* (2013.01); *H04W 8/26* (2013.01); *H04W 16/10* (2013.01);
(Continued)

(58) Field of Classification Search
CPC ............ H04W 72/0453; H04W 16/14; H04W 52/243; H04W 52/367; H04W 52/42;
(Continued)

(56) References Cited

U.S. PATENT DOCUMENTS 4,369,520 A   1/1983  Cerny, Jr. et al.
5,912,646 A   6/1999  Seki et al.
(Continued)

OTHER PUBLICATIONS

3GPP TS 38.212 V.15.10.0 3rd Generation Partnership Project; Technical Specification Group Radio Access Network; NR; Multiplexing and Channel Coding (Release 15), Sep. 2020.
(Continued)

*Primary Examiner* — Lewis G West
(74) *Attorney, Agent, or Firm* — Patent Beach PC

(57) ABSTRACT

Apparatus and methods for providing multi-tier quasi-licensed spectrum wireless service via a common wireless access node such as a small-cell. In one embodiment, the quasi-licensed system utilizes multi-sector antennae to create antenna lobes adaptively according to parameters associated with different cell sectors, such as user traffic, random access requests, and/or interference. In one variant, when the user traffic or interference is determined to be very high in a particular sector, the sector is configured and activated based on the availability of low-noise spectrum. In another variant, when a new sector is created, the electrical power resources available for that sector are checked, and based on the amount of power available at that sector, either CBSD Category A or B status is allocated to that sector.

20 Claims, 25 Drawing Sheets

Related U.S. Application Data continuation of application No. 16/861,107, filed on Apr. 28, 2020, now Pat. No. 11,438,769.

(51) Int. Cl.
| | |
|---|---|
| *H04W 16/10* | (2009.01) |
| *H04W 72/0453* | (2023.01) |
| *H04W 72/541* | (2023.01) |
| *H04W 74/0833* | (2024.01) |
| *H04W 84/04* | (2009.01) |
| *H04W 88/06* | (2009.01) |

(52) U.S. Cl.
CPC ..... *H04W 72/0453* (2013.01); *H04W 72/541* (2023.01); *H04W 88/06* (2013.01); *H04W 74/0833* (2013.01); *H04W 84/042* (2013.01)

(58) Field of Classification Search
CPC . H04W 72/046; H04W 72/541; H04W 64/00; H04W 84/12; Y02D 30/70
See application file for complete search history.

(56) References Cited

U.S. PATENT DOCUMENTS

| | | | |
|---|---|---|---|
| 6,088,003 A | 7/2000 | Bassirat | |
| 6,127,972 A | 10/2000 | Avidor et al. | |
| 6,449,481 B1* | 9/2002 | Kwon | H04W 36/302 |
| | | | 455/437 |
| 6,745,051 B1 | 6/2004 | Bassirat | |
| 6,933,900 B2 | 8/2005 | Kitamori et al. | |
| 7,002,518 B2 | 2/2006 | Lin et al. | |
| 7,088,288 B1 | 8/2006 | Margolese et al. | |
| 7,092,722 B1* | 8/2006 | Oh | H04W 36/18 |
| | | | 370/332 |
| 7,218,286 B2 | 5/2007 | Munk | |
| 7,397,425 B2 | 7/2008 | Ranta et al. | |
| 7,643,794 B2 | 1/2010 | Ofek et al. | |
| 7,656,364 B2 | 2/2010 | Masini | |
| 7,724,200 B2 | 5/2010 | Kitamori et al. | |
| 7,881,263 B1* | 2/2011 | Vargantwar | H04W 36/322 |
| | | | 455/456.1 |
| 7,978,144 B2 | 7/2011 | Tanabe et al. | |
| 8,237,619 B2 | 8/2012 | Vassilakis et al. | |
| 8,405,567 B2 | 3/2013 | Park et al. | |
| 8,452,319 B2 | 5/2013 | Lee et al. | |
| 8,515,495 B2 | 8/2013 | Shang et al. | |
| 8,706,165 B2* | 4/2014 | Skarby | H01Q 1/246 |
| | | | 455/562.1 |
| 8,983,461 B1* | 3/2015 | Pandey | H04W 16/18 |
| | | | 455/442 |
| 9,232,558 B1 | 1/2016 | Tinoco et al. | |
| 9,368,880 B2 | 6/2016 | Solondz | |
| 9,425,837 B1* | 8/2016 | Hwang | H04B 1/0475 |
| 9,426,770 B2* | 8/2016 | Agrawal | A01K 1/01 |
| 9,729,423 B1 | 8/2017 | Tinoco et al. | |
| 9,735,743 B1* | 8/2017 | McCallister | H03F 1/0222 |
| 9,831,548 B2 | 11/2017 | Timofeev et al. | |
| 9,882,612 B1 | 1/2018 | Da Silveira et al. | |
| 10,193,236 B1 | 1/2019 | Lee et al. | |
| 10,271,351 B1* | 4/2019 | Wang | H04W 16/14 |
| 10,292,160 B1* | 5/2019 | Marupaduga | H04W 74/0833 |
| 10,980,025 B2 | 4/2021 | Hmimy et al. | |
| D932,310 S * | 10/2021 | Hainaut | D9/551 |
| 11,196,469 B1* | 12/2021 | Tiwari | H04B 7/0617 |
| 11,438,769 B2 | 9/2022 | Sevindik et al. | |
| 11,533,629 B2 | 12/2022 | Sevindik et al. | |
| 2003/0232600 A1* | 12/2003 | Montgomery | H01Q 21/26 |
| | | | 455/562.1 |
| 2004/0190479 A1 | 9/2004 | Deane et al. | |
| 2004/0196813 A1 | 10/2004 | Ofek et al. | |
| 2007/0142057 A1 | 6/2007 | Murakami et al. | |
| 2007/0281635 A1* | 12/2007 | McCallister | H03F 1/02 |
| | | | 455/126 |
| 2008/0125047 A1 | 5/2008 | Li et al. | |
| 2008/0137566 A1 | 6/2008 | Marholev et al. | |
| 2009/0116449 A1* | 5/2009 | Kishiyama | H04B 7/0491 |
| | | | 370/331 |
| 2009/0121936 A1 | 5/2009 | Maltsev et al. | |
| 2010/0008338 A1 | 1/2010 | Tsfati et al. | |
| 2010/0165892 A1 | 7/2010 | Cha et al. | |
| 2010/0178929 A1* | 7/2010 | Kennedy, Jr. | G01S 5/021 |
| | | | 455/456.1 |
| 2010/0240321 A1 | 9/2010 | Hung et al. | |
| 2010/0302976 A1 | 12/2010 | Tikka | |
| 2012/0014349 A1 | 1/2012 | Chung et al. | |
| 2012/0129551 A1 | 5/2012 | Islam | |
| 2013/0210491 A1 | 8/2013 | Eriksson et al. | |
| 2013/0215786 A1* | 8/2013 | Breuer | H04K 3/22 |
| | | | 370/252 |
| 2014/0031045 A1* | 1/2014 | Kosseifi | H04W 36/322 |
| | | | 455/440 |
| 2015/0145468 A1* | 5/2015 | Ma | H02J 7/007 |
| | | | 320/107 |
| 2015/0155921 A1 | 6/2015 | Louzir et al. | |
| 2015/0358070 A1 | 12/2015 | Ohm | |
| 2015/0365890 A1 | 12/2015 | Rajendran et al. | |
| 2016/0135210 A1 | 5/2016 | Nammi et al. | |
| 2016/0149622 A1 | 5/2016 | Ma | |
| 2016/0218426 A1 | 7/2016 | Kelly et al. | |
| 2016/0323899 A1* | 11/2016 | Arvidson | H04B 17/336 |
| 2017/0264487 A1* | 9/2017 | Scahill | H04W 4/70 |
| 2018/0049151 A1* | 2/2018 | Yoon | G01S 5/0036 |
| 2018/0092103 A1* | 3/2018 | Gurney | H04W 16/14 |
| 2018/0212669 A1 | 7/2018 | Li et al. | |
| 2019/0073008 A1* | 3/2019 | Adrian | G06F 1/26 |
| 2019/0089806 A1* | 3/2019 | Deshpande | H04W 48/12 |
| 2019/0173535 A1 | 6/2019 | Ma | |
| 2019/0190548 A1 | 6/2019 | Chang et al. | |
| 2019/0268051 A1 | 8/2019 | Ho et al. | |
| 2019/0273583 A1* | 9/2019 | Ugurlu | H04W 24/10 |
| 2019/0304937 A1 | 10/2019 | Jin | |
| 2020/0014693 A1 | 1/2020 | Frederick et al. | |
| 2020/0045627 A1* | 2/2020 | Wolfe | H04L 5/0092 |
| 2020/0136696 A1* | 4/2020 | El-Rayis | H04B 7/0404 |
| 2020/0169377 A1 | 5/2020 | Lee et al. | |
| 2020/0235493 A1 | 7/2020 | Khlat | |
| 2020/0236644 A1* | 7/2020 | Gunnarsson | H04W 64/00 |
| 2021/0014693 A1 | 1/2021 | Syed et al. | |
| 2021/0211161 A1 | 7/2021 | Peralta et al. | |
| 2021/0219261 A1 | 7/2021 | Gundavelli et al. | |
| 2021/0274590 A1 | 9/2021 | Tao et al. | |
| 2021/0297109 A1 | 9/2021 | Ono et al. | |
| 2021/0313841 A1 | 10/2021 | Johnston et al. | |
| 2021/0329467 A1 | 10/2021 | Sevindik et al. | |
| 2022/0061122 A1* | 2/2022 | Bao | H04L 5/0053 |
| 2022/0171045 A1 | 6/2022 | Johnston et al. | |
| 2022/0232367 A1 | 7/2022 | Gopal et al. | |
| 2023/0032636 A1* | 2/2023 | Go | H04R 1/1025 |
| 2024/0154707 A1* | 5/2024 | Outes Carnero | H04W 24/02 |

OTHER PUBLICATIONS

Deering, S., et al., "Internet Protocol, Version 6 (IPv6) Specification," Internet Engineering Task Force (IETF) RFC 2460, Dec. 1998, 39 pages.

IEEE Std. 802.11 or related standards including 802.11a/b/g/n/s/v/ac/ad/ax/ay/ba/be or 802.11-2012/2013, 802.11-2016.

"Internet Protocol, DARPA Internet Program, Protocol Specification", IETF RCF 791, Sep. 1981, 50 pages.

Nokia 5G New Radio (NR): Physical Layer Overview and Performance, IEEE Communication Theory Workshop, 2018 by A. Ghosh, May 15, 2018, 38 pages.

Signaling Protocols and Procedures for Citizens Broadband Radio Service (CBRS): Spectrum Access System, (SAS)—Citizens Broadband Radio Service Device (CBSD) Interface Technical Specification—Document WINNF-TS-0016, Version V1.2.1.3, Jan. 3, 2018, 60 pages.

(56) References Cited

OTHER PUBLICATIONS

Wi-Fi Direct, "Wi-Fi Peer-to-Peer (P2P) Specification," Wi-Fi Alliance, Version 1.5, 2014, 183 pages.

* cited by examiner

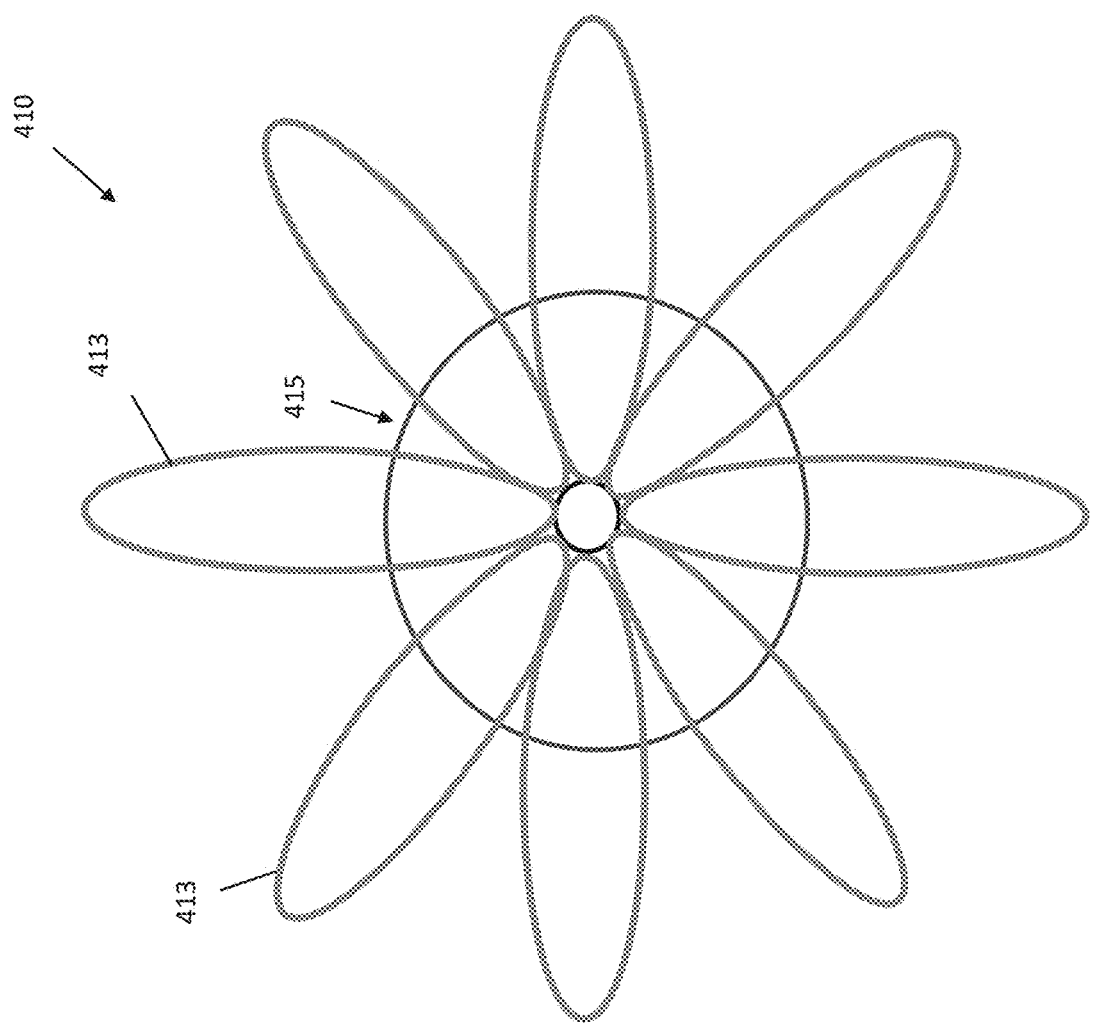

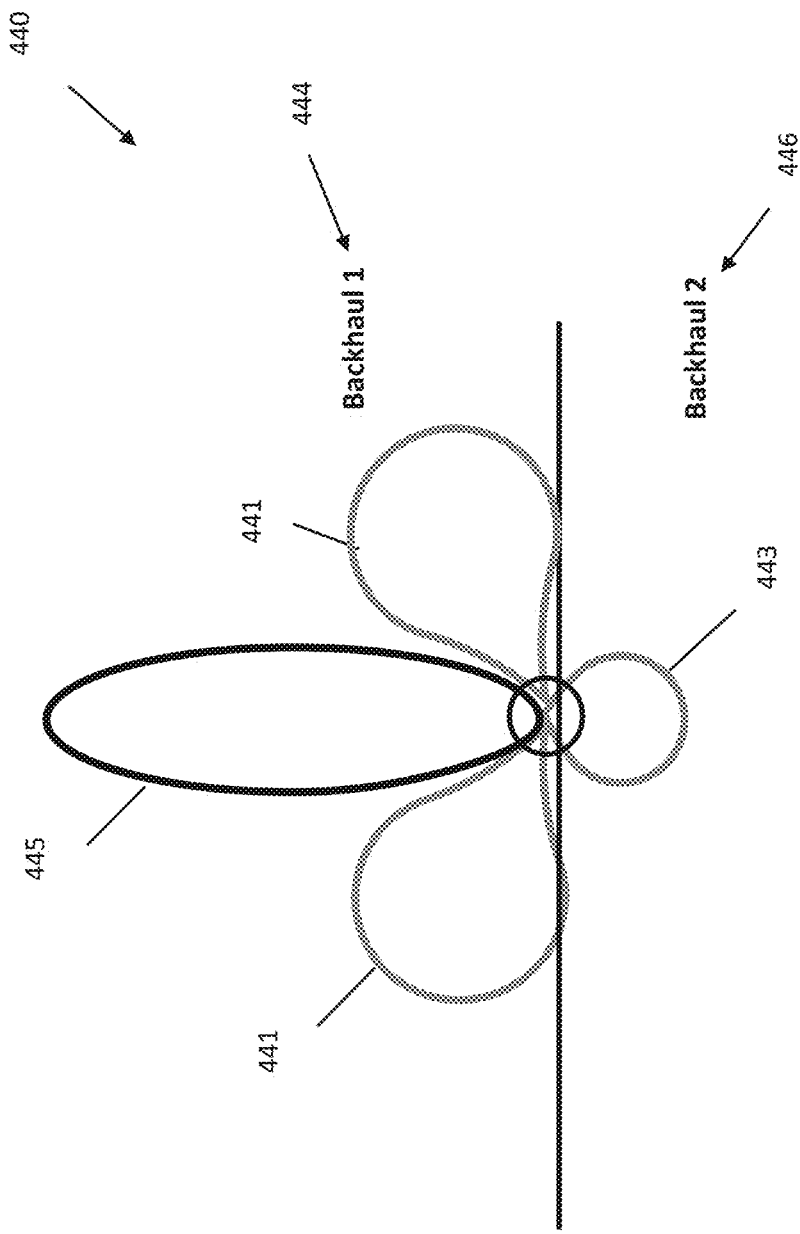

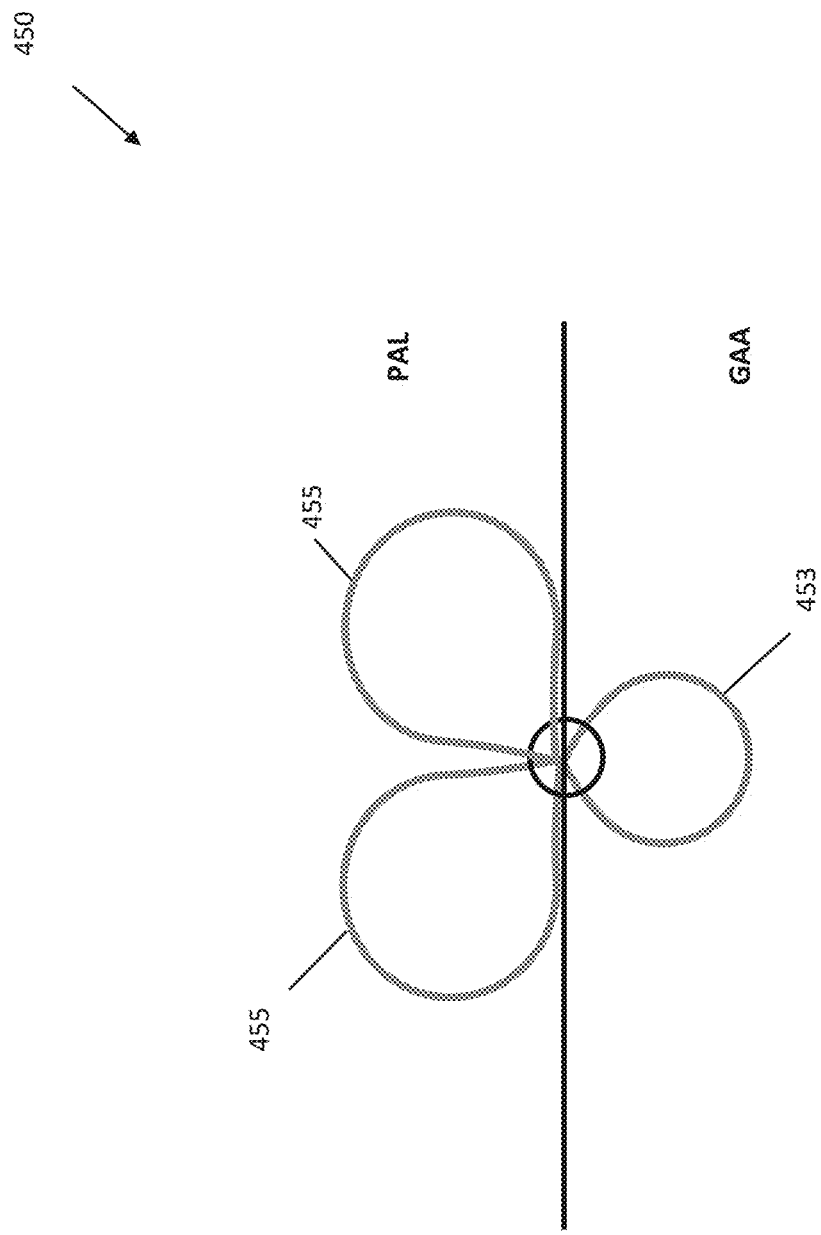

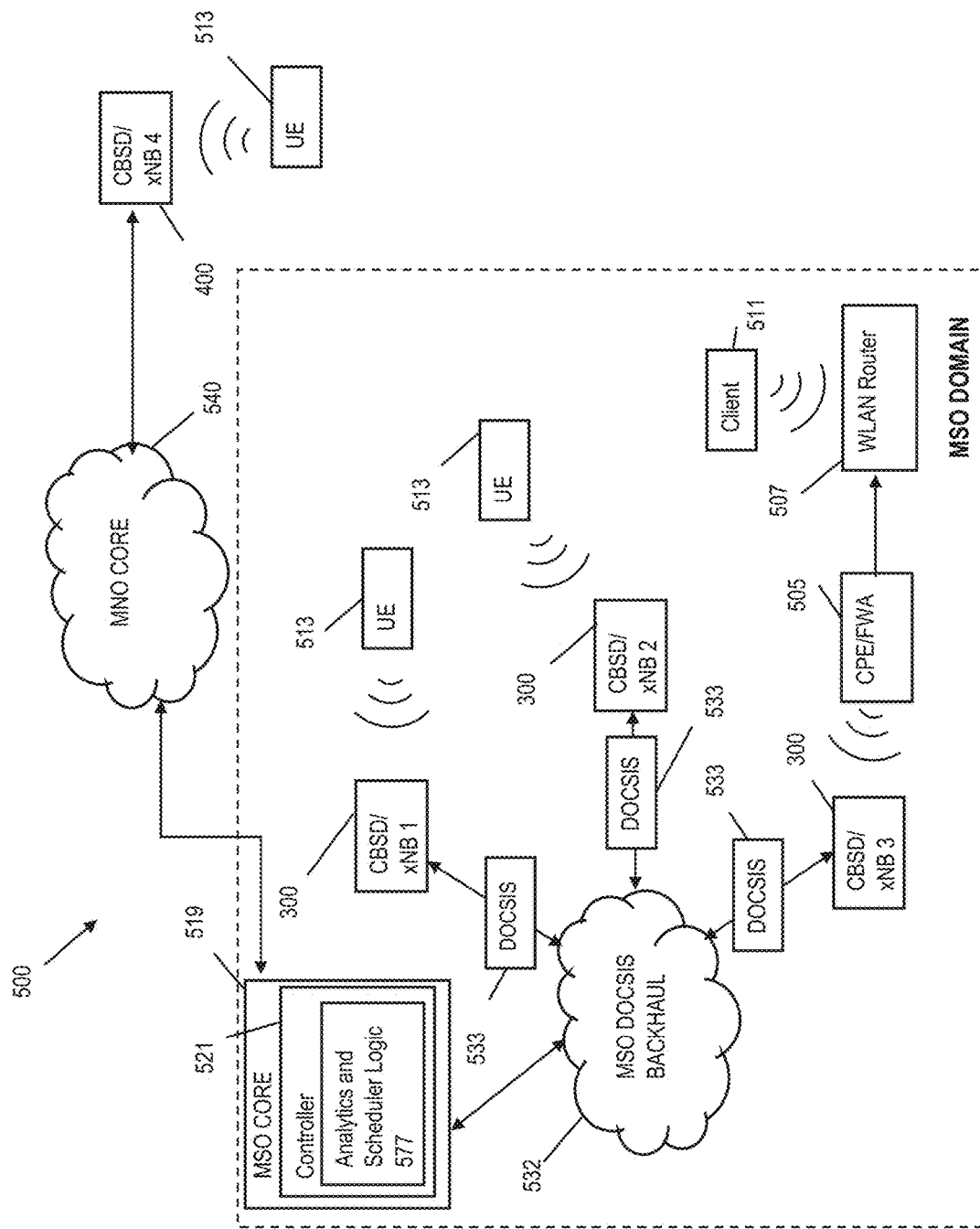

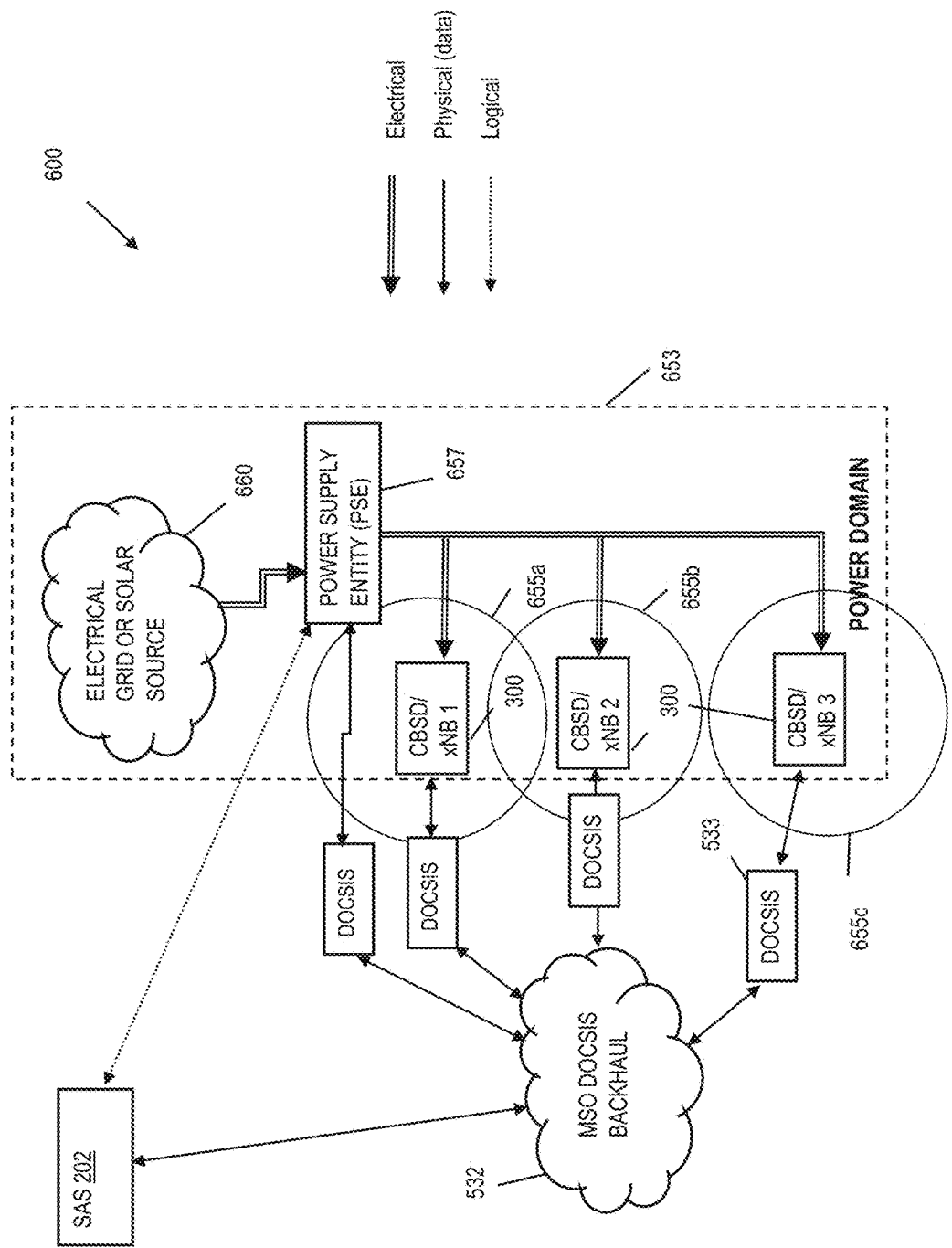

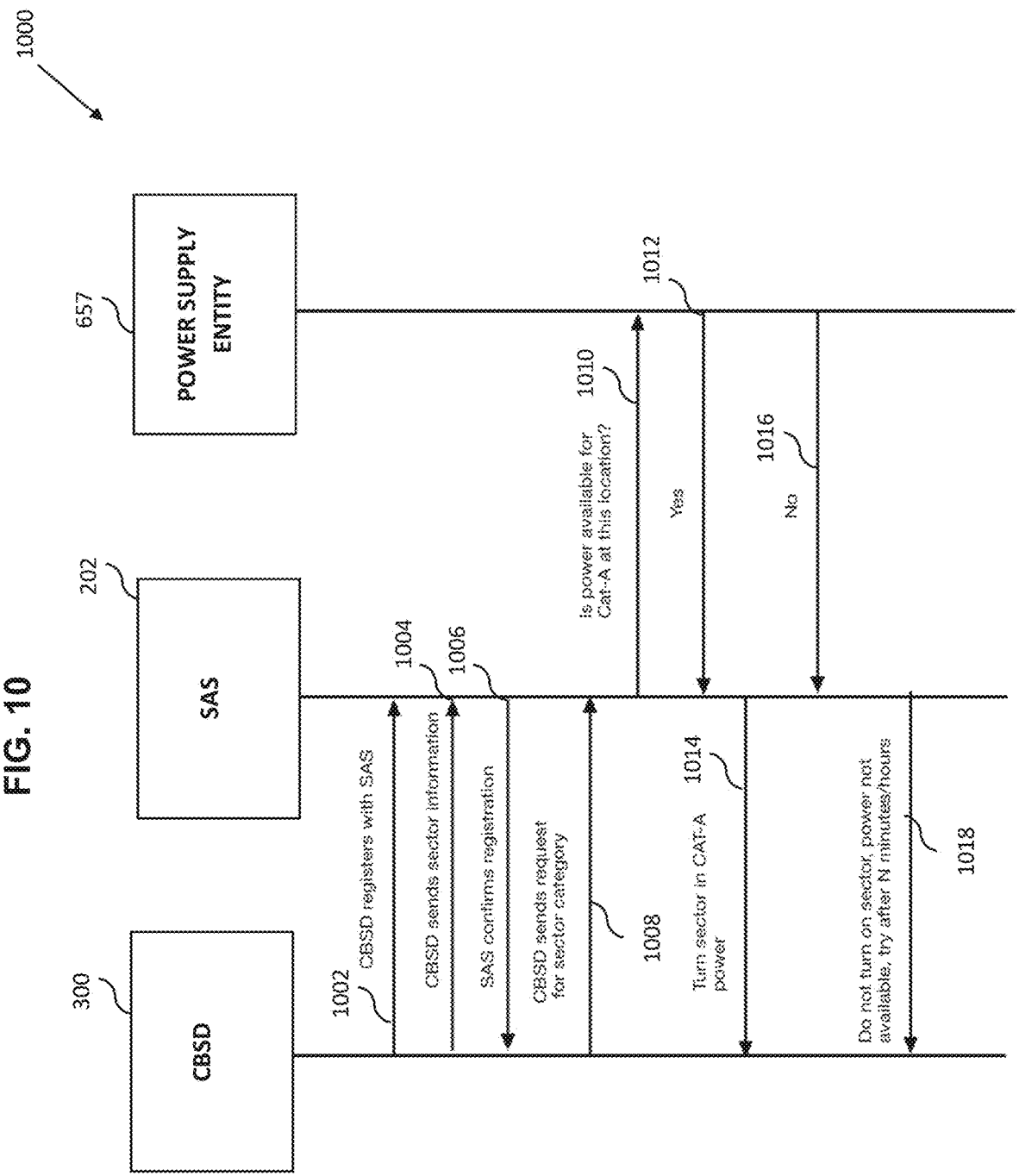

APPARATUS AND METHODS FOR SPATIAL AND OPERATIONAL DIFFERENTIATION AND OPTIMIZATION IN A WIRELESS SYSTEM

PRIORITY AND RELATED APPLICATIONS

This application is a continuation of and claims priority to co-owned and co-pending U.S. patent application Ser. No. 17/902,874 of the same title filed Sep. 4, 2022, and issuing as U.S. Pat. No. 11,785,474 on Oct. 10, 2023, which is a continuation of and claims priority to co-owned U.S. patent application Ser. No. 16/861,107 of the same title filed Apr. 28, 2020, and issued as U.S. Pat. No. 11,438,769 on Sep. 6, 2022, each of which are incorporated herein by reference in its entirety.

Additionally, this application is generally related to the subject matter of co-owned and U.S. Provisional Patent Application Ser. No. 62/873,141 filed Jul. 11, 2019, 2019 and entitled "APPARATUS AND METHODS FOR HETEROGENEOUS COVERAGE AND USE CASES IN A QUASI-LICENSED WIRELESS SYSTEM," as well as co-owned and co-pending U.S. patent application Ser. No. 16/854,689 filed Apr. 21, 2020 and entitled "SCHEDULED AMPLIFIER WIRELESS BASE STATION APPARATUS AND METHODS," each of the foregoing which is incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

1. Technological Field

The present disclosure relates generally to the field of wireless networks and specifically, in one or more exemplary embodiments, to methods and apparatus for dynamically prioritizing and reassigning radio frequency spectrum and users, such as for example those providing connectivity via quasi-licensed Citizens Broadband Radio Service (CBRS) technologies.

2. Description of Related Technology

A multitude of wireless networking technologies, also known as Radio Access Technologies ("RATs"), provide the underlying means of connection for radio-based communication networks to user devices. Such RATs often utilize licensed radio frequency spectrum (i.e., that allocated by the FCC per the Table of Frequency Allocations as codified at Section 2.106 of the Commission's Rules. In the United States, regulatory responsibility for the radio spectrum is divided between the U.S. Federal Communications Commission (FCC) and the National Telecommunications and Information Administration (NTIA). The FCC, which is an independent regulatory agency, administers spectrum for non-Federal use (i.e., state, local government, commercial, private internal business, and personal use) and the NTIA, which is an operating unit of the Department of Commerce, administers spectrum for Federal use (e.g., use by the Army, the FAA, and the FBI). Currently only frequency bands between 9 kHz and 275 GHz have been allocated (i.e., designated for use by one or more terrestrial or space radio communication services or the radio astronomy service under specified conditions). For example, a typical cellular service provider might utilize spectrum for so-called "3G" (third generation) and "4G" (fourth generation) wireless communications as shown in Table 1 below:

TABLE 1

| Technology | Bands |
|---|---|
| 3G | 850 MHz Cellular, Band 5 (GSM/GPRS/EDGE). |
| | 1900 MHz PCS, Band 2 (GSM/GPRS/EDGE). |
| | 850 MHz Cellular, Band 5 |
| | (UMTS/HSPA+ up to 21 Mbit/s). |
| | 1900 MHz PCS, Band 2 |
| | (UMTS/HSPA+ up to 21 Mbit/s). |
| 4G | 700 MHz Lower B/C, Band 12/17 (LTE). |
| | 850 MHz Cellular, Band 5 (LTE). |
| | 1700/2100 MHz AWS, Band 4 (LTE). |
| | 1900 MHz PCS, Band 2 (LTE). |
| | 2300 MHz WCS, Band 30 (LTE). |

Alternatively, unlicensed spectrum may be utilized, such as that within the so-called ISM-bands. The ISM bands are defined by the ITU Radio Regulations (Article 5) in footnotes 5.138, 5.150, and 5.280 of the Radio Regulations. In the United States, uses of the ISM bands are governed by Part 18 of the Federal Communications Commission (FCC) rules, while Part 15 contains the rules for unlicensed communication devices, even those that share ISM frequencies. Table 2 below shows typical ISM frequency allocations:

TABLE 2

| Frequency range | Type | Center frequency | Availability | Licensed users |
|---|---|---|---|---|
| 6.765 MHz-6.795 MHz | A | 6.78 MHz | Subject to local acceptance | Fixed service & mobile service |
| 13.553 MHz-13.567 MHz | B | 13.56 MHz | Worldwide | Fixed & mobile services except aeronautical mobile (R) service |
| 26.957 MHz-27.283 MHz | B | 27.12 MHz | Worldwide | Fixed & mobile service except aeronautical mobile service, CB radio |

TABLE 2-continued

| Frequency range | Type | Center frequency | Availability | Licensed users |
|---|---|---|---|---|
| 40.66 MHz-40.7 MHz | B | 40.68 MHz | Worldwide | Fixed, mobile services & earth exploration-satellite service |
| 433.05 MHz-434.79 MHz | A | 433.92 MHz | only in Region 1, subject to local acceptance | amateur service & radiolocation service, additional apply the provisions of footnote 5.280 |
| 902 MHz-928 MHz | B | 915 MHz | Region 2 only (with some exceptions) | Fixed, mobile except aeronautical mobile & radiolocation service; in Region 2 additional amateur service |
| 2.4 GHz-2.5 GHz | B | 2.45 GHz | Worldwide | Fixed, mobile, radiolocation, amateur & amateur-satellite service |
| 5.725 GHz-5.875 GHz | B | 5.8 GHz | Worldwide | Fixed-satellite, radiolocation, mobile, amateur & amateur-satellite service |
| 24 GHz-24.25 GHz | B | 24.125 GHz | Worldwide | Amateur, amateur-satellite, radiolocation & earth exploration-satellite service (active) |
| 61 GHz-61.5 GHz | A | 61.25 GHz | Subject to local acceptance | Fixed, inter-satellite, mobile & radiolocation service |
| 122 GHz-123 GHz | A | 122.5 GHz | Subject to local acceptance | Earth exploration-satellite (passive), fixed, inter-satellite, mobile, space research (passive) & amateur service |
| 244 GHz-246 GHz | A | 245 GHz | Subject to local acceptance | Radiolocation, radio astronomy, amateur & amateur-satellite service |

ISM bands are also been shared with (non-ISM) license-free communications applications such as wireless sensor networks in the 915 MHz and 2.450 GHz bands, as well as wireless LANs and cordless phones in the 915 MHz, 2.450 GHz, and 5.800 GHz bands.

Additionally, the 5 GHz band has been allocated for use by, e.g., WLAN equipment, as shown in Table 3:

TABLE 3

| Band Name | Frequency Band | Dynamic Freq. Selection Required (DFS)? |
|---|---|---|
| UNII-1 | 5.15 to 5.25 GHz | No |
| UNII-2 | 5.25 to 5.35 GHz | Yes |
| UNII-2 Extended | 5.47 to 5.725 GHz | Yes |
| UNII-3 | 5.725 to 5.825 GHz | No |

User client devices (e.g., smartphone, tablet, phablet, laptop, smartwatch, or other wireless-enabled devices, mobile or otherwise) generally support multiple RATs that enable the devices to connect to one another, or to networks (e.g., the Internet, intranets, or extranets), often including RATs associated with both licensed and unlicensed spectrum. In particular, wireless access to other networks by client devices is made possible by wireless technologies that utilize networked hardware, such as a wireless access point ("WAP" or "AP"), small cells, femtocells, or cellular towers, serviced by a backend or backhaul portion of service provider network (e.g., a cable network). A user may generally access the network at a "hotspot," a physical location at which the user may obtain access by connecting to modems, routers, APs, etc. that are within wireless range.

CBRS—

In 2016, the FCC made available Citizens Broadband Radio Service (CBRS) spectrum in the 3550-3700 MHz (3.5 GHz) band, making 150 MHz of spectrum available for mobile broadband and other commercial users. The CBRS is unique, in that it makes available a comparatively large amount of spectrum (frequency bandwidth) without the need for expensive auctions, and without ties to a particular operator or service provider.

Moreover, the CBRS spectrum is suitable for shared use between government and commercial interests, based on a system of existing "incumbents," including the Department of Defense (DoD) and fixed satellite services. Specifically, a three-tiered access framework for the 3.5 GHz is used; i.e., (i) an Incumbent Access tier 102, (ii) Priority Access tier 104, and (iii) General Authorized Access tier 106. See FIG. 1. The three tiers are coordinated through one or more dynamic Spectrum Access Systems (SAS) 202 as shown in FIG. 1A and Appendix I (including e.g., Band 48 therein).

Incumbent Access (existing DOD and satellite) users 102 include authorized federal and grandfathered Fixed Satellite Service (FSS) users currently operating in the 3.5 GHz band shown in FIG. 1. These users will be protected from harmful interference from Priority Access License (PAL) and General Authorized Access (GAA) users. The sensor networks, operated by Environmental Sensing Capability (ESC) operators, make sure that incumbents and others utilizing the spectrum are protected from interference.

The Priority Access tier 104 (including acquisition of spectrum for up to three years through an auction process) consists of Priority Access Licenses (PALs) that will be assigned using competitive bidding within the 3550-3650

MHz portion of the band. Each PAL is defined as a non-renewable authorization to use a 10 MHz channel in a single census tract for three years. Up to seven (7) total PALs may be assigned in any given census tract, with up to four PALs going to any single applicant. Applicants may acquire up to two-consecutive PAL terms in any given license area during the first auction.

The General Authorized Access tier 106 (for any user with an authorized 3.5 GHz device) is licensed-by-rule to permit open, flexible access to the band for the widest possible group of potential users. General Authorized Access (GAA) users are permitted to use any portion of the 3550-3700 MHz band not assigned to a higher tier user and may also operate opportunistically on unused Priority Access License (PAL) channels. See FIG. 1A.

The FCC's three-tiered spectrum sharing architecture of FIG. 1 utilizes "fast-track" band (3550-3700 MHz) identified by PCAST and NTIA, while Tier 2 and 3 are regulated under a new Citizens Broadband Radio Service (CBRS). CBSDs (Citizens Broadband Radio Service Devices—in effect, wireless access points) 206 (FIG. 2) can only operate under authority of a centralized Spectrum Access System (SAS) 202. Rules are optimized for small-cell use, but also accommodate point-to-point and point-to-multipoint, especially in rural areas.

Under the FCC system, the standard SAS 202 includes the following elements: (1) CBSD registration; (2) interference analysis; (3) incumbent protection; (4) PAL license validation; (5) CB SD channel assignment; (6) CBSD power limits; (7) PAL protection; and (8) SAS-to-SAS coordination. As shown in FIG. 2, these functions are provided for by, inter alia, an incumbent detection (i.e., environmental sensing) function 207 configured to detect use by incumbents, and an incumbent information function 209 configured to inform the incumbent when use by another user occurs. An FCC database 211 is also provided, such as for PAL license validation, CBSD registration, and other functions.

An optional Domain Proxy (DP) 208 is also provided for in the FCC architecture. Each DP 208 includes: (1) SAS interface GW including security; (2) directive translation between CBSD 206 and domain commands; (3) bulk CBSD directive processing; and (4) interference contribution reporting to the SAS.

A domain is defined is any collection of CBSDs 206 that need to be grouped for management; e.g.: large enterprises, venues, stadiums, train stations. Domains can be even larger/broader in scope, such as for example a terrestrial operator network. Moreover, domains may or may not use private addressing. A Domain Proxy (DP) 208 can aggregate control information flows to other SAS, such as e.g., a Commercial SAS (CSAS, not shown), and generate performance reports, channel requests, heartbeats, etc.

CBSDs 206 can generally be categorized as either Category A or Category B. Category A CBSDs have an EIRP or Equivalent Isotropic Radiated Power of 30 dBm (1 Watt)/10 MHz, fixed indoor or outdoor location (with an antenna <6 m in length if outdoor). Category B CBSDs have 47 dBm EIRP (50 Watts)/10 MHz, and fixed outdoor location only. Professional installation of Category B CBSDs is required, and the antenna must be less than 6 m in length. All CBSD's have a vertical positioning accuracy requirement of +/−3 m. Terminals (i.e., user devices akin to UE) have 23 dBm EIRP (0.2 Watts)/10 MHz requirements, and mobility of the terminals is allowed.

In terms of spectral access, CBRS utilizes a time division duplex (TDD) multiple access architecture.

Omni- and Multi-Sector Antenna Technology and Related Small-Cell Challenges

Extant CBRS architectures typically use omni-directional antennas. Traditional omni-directional antennas uniformly radiate power in all directions in the horizontal (azimuth) plane. However, this not an effective coverage solution in many cases, due to often limited footprint, and the antenna being prone to interference (thereby degrading overall network performance). Specifically, one disadvantage of using an omni-directional antenna is that the interference is received from all directions which could degrade the system performance.

Alternatively, directional multi-sector antennas are a promising technology in wireless networks. A multi-sector antenna divides a 360 degrees horizontal plane (or other coverage arc) into N smaller segments. The multi-sector antenna generally radiates power in each sector in a particular angle optimized for that sector. This directional and concentrated power radiation in each sector increases the directional gain of the antenna, and reduces the effects of interference. Therefore, the multi-sector antennas are more efficient than omni-directional antennas in this regard. The directional power radiation is typically adjustable such as e.g., by using software defined radio and multiple antennas.

Multi-Sector antennas provide a means of increasing cellular network capacity and coverage without using additional frequency spectrum. High-order sectorization is particularly used for cost-effective hotspots. In these hotspot areas multiple antennas with narrow bandwidth and high directivity gain can be used to increase the overall capacity. For instance, one sector of the cell may be used to serve part of a cell that has higher traffic, while an overlapping larger sector may be used to serve in the part of the cell that has lower traffic.

Switched-beam antenna technology is often used in multi-sector antenna deployments. In switched-beam antennas, the base station measures the received signal strength, and based on signal strength chooses one of several pre-defined fixed-beam options. Switched-beam antennas combine the output of multiple antennas in such a way to form a more finely sectorized directional beam than can be achieved in single sector antenna system.

So-called "smart" antennas are another technology used in multi-sector antenna systems. The smart antennas use multiple antennas to shape the beam pattern. The smart antennas use the space dimension to provide control over space, and create the desired beam shape. Flexibility and control over the beam shape is achieved through the beam-forming process by altering the amplitude and phase of the radiated signals from the individual antenna elements using software defined radio. Smart antennas provide maximum power in the desired direction through steering the main beam in a chosen angle, while nulls can be steered in the direction of interferers.

Despite the foregoing, current omni-directional and multi-sector antennas and associated base station configurations are not well adapted to certain use cases or operational considerations/limitations, including for instance availability of certain types of spectrum (which may change dynamically over time), user/handover density or variations, available electrical power, and the location of the base station (which may not have much forethought or analysis of its placement and installed configuration as larger macro-cell devices used in cellular networks do prior to their deployment).

Rather, prior art base station or small-cell configurations generally are "one size fits all" in terms of sector utilization, and do not have mechanisms for more precise spatial or operational differentiation between sectors. Even those with "smart" antennae and beamforming still suffer from the disabilities highlighted above, which can in large part be traced to the need to support ad hoc placement of small-cells (some which may even be placed/installed by customers themselves). Stated simply, commoditized small-cells such as those which might be utilized by many customers of a given network operator may be placed in challenging RF and physical locations/environments, have limited physical plant resources, and encounter high user count (and user density) when used in e.g., more urbanized areas. Other complexities such as available backhaul or service differentiation for different types of users served by a given small-cell may further exacerbate the shortcomings of such prior art small-cells.

Accordingly, there exists a need for apparatus and methodologies to improve, inter alia, wireless small-cell service and performance, so as to optimize utilization of available spectrum, processing, and electrical power resources which may each be limited in e.g., consumer-based small-cell applications.

SUMMARY

The present disclosure addresses the foregoing needs by providing, inter alia, apparatus and methods for providing installation-specific heterogeneous (e.g., different types of spectrum, user, served areas, etc.) wireless services using quasi-licensed spectrum such as CBRS spectrum.

In a first aspect of the disclosure, wireless access point apparatus is described. In one embodiment, the apparatus includes: digital processor apparatus; a wireless transceiver apparatus in data communication with the digital processor apparatus and comprising a plurality of antenna elements, each of the plurality of antenna element configured to serve a respective azimuth sector; and computer readable apparatus in data communication with the digital processor apparatus and comprising a storage medium, the storage medium comprising at least one computer program having a plurality of instructions.

In one variant, the instructions are configured to, when executed on the digital processor apparatus, cause the wireless access point apparatus to: generate and transmit a message to a network entity to obtain one or more grants to use radio frequency (RF) spectrum of at least a first type or of a second, different type; receive one or more grant messages enabling use of one or more carrier frequencies of the first type of RF spectrum or the second, different type of RF spectrum; and configure the at least one transceiver apparatus to use the one or more carrier frequencies within only a subset of the plurality of antenna elements, the configuration of the at least one transceiver based at least in part on the one or more carrier frequencies being of the first type of RF spectrum or the second type of RF spectrum.

In one implementation, the network entity comprises at least one of a CBRS (Citizens Broadband Radio Service) domain proxy (DP) or Spectrum Allocation System (SAS); and the first type of RF spectrum comprises quasi-licensed CBRS GAA (General Authorized Access) spectrum, and the second type of RF spectrum comprises quasi-licensed CBRS PAL (Priority Access Licensed) spectrum.

In another implementation, the configuration of the at least one transceiver is further based at least in part on at least one metric relating to at least one of (i) user traffic density on a per-sector basis, or (ii) user device handover frequency or density. In one such configuration, the network entity comprises at least one of a CBRS (Citizens Broadband Radio Service) domain proxy (DP) or Spectrum Allocation System (SAS); and the one or more carrier frequencies comprise the CBRS PAL spectrum; and one or more sectors of a highest one of said at least one of (i) user traffic density on a per-sector basis, or (ii) user device handover frequency or density, is preferentially assigned said PAL spectrum as part of said configuration.

In a further implementation, the wireless access point further includes computerized logic in data communication with the data processor apparatus, the computerized logic configured to obtain data relating to at least one electrical power supply in communication with said wireless access point, and utilize the obtained data to determine at least one aspect of said configuration of the at least one transceiver. For example, the at least one transceiver apparatus comprises a plurality of transceiver apparatus associated with respective ones of said sectors, and said determination of at least one aspect of said configuration of the at least one transceiver comprises a determination on whether sufficient electrical power exists to energize a prescribed number of said sectors and associated transceiver apparatus simultaneously.

In another aspect, a method of operating a wireless access point comprising a plurality of served sectors is disclosed. In one embodiment, the method comprises: determining data relating to handover requests associated with different wireless cells; based at least on the determined data, obtaining data relating to at least one location of at least one of the different wireless cells; and based at least on the obtained data relating to locations, causing selective activation of at least one of the plurality of sectors.

In one variant, the method further includes causing registering of at least a portion of the plurality of served sectors with a network spectrum allocation entity. In one such approach, the determining data relating to handover requests associated with different wireless cells comprises determining one or more physical cell identities (PCIs) associated with respective ones of the different wireless cells; and the obtaining data relating to at least one location of at least one of the different wireless cells comprises contacting the network spectrum allocation entity to obtain data relating to the at least one of the different cells based at least on the determined one or more PCIs.

In another variant, the causing selective activation of at least one of the plurality of sectors comprises causing selective activation of at least one of the plurality of served sectors, the at least one activated sector encompassing the at least one location in an azimuth of coverage of the at least one activated sector.

In yet another variant, the causing selective activation of the at least one of the plurality of served sectors comprises: obtaining data relating to an interference level associated with the at least one served sector; and based at least in part on the obtained data relating to an interference level, causing request of a spectrum grant of at least one of (i) a first type of generally accessible spectrum; or (ii) a second type of restricted access spectrum. For instance, in one such approach, the causing request of a spectrum grant of at least one of (i) a first type of generally accessible spectrum; or (ii) a second type of restricted access spectrum comprises: determining based at least on the obtained data relating to an interference level that an interference level of the at least one served sector is greater than a threshold amount; and based at least on the determining based at least on the obtained data relating to an interference level, causing request of a spectrum grant of the second type of restricted access spectrum only.

In another variant, the method further includes: determining a plurality of random access requests via a plurality of the served sectors; receiving PCI data from at least one user device; based at least on the received PCI data, obtaining data relating to a location associated with at least one PCI; and based at least on the obtained data, causing selective activation of at least one of the plurality of sectors comprises causing selective activation of at least one of the plurality of served sectors, the at least one activated sector encompassing the location associated with the at least one PCI in an azimuth of coverage of the at least one activated sector.

In a further variant, the method further comprises: obtaining data relating to at least one electrical power supply capability for electrical power service to the wireless access point; and utilizing the obtained data relating to the at least one electrical power supply capability to configure the causing selective activation of at least one of the plurality of sectors according to either a first power level or a second power level, the second power level higher than the first power level. For example, in one implementation, the utilizing the obtained data relating to the at least one electrical power supply capability to configure the causing selective activation of at least one of the plurality of sectors according to either a first power level or a second power level comprises using data indicative of sufficient electrical power to support CBRS Category B CBSD (Citizens Broadband Service Radio Device) operation to cause activation according to the second power level, the second power at or below a CBRS Category B EIRP (effective isotropic radiated power) limit, but above a CBRS Category A EIRP limit.

In another aspect of the disclosure, computer readable apparatus comprising at least one storage medium is described. In one embodiment, the at least one storage medium comprises at least one computer program configured to, when executed on a processing apparatus of a multi-sector base station apparatus, cause selective activation of one or more sectors of the multi-sector base station apparatus by at least: registration with a network spectrum allocation entity of each of a plurality of sectors of the multi-sector base station apparatus; obtainment of data relating to at least one PCI (physical cell identifier) within a coverage area of one or more of the plurality of sectors; determination of an interference level associated with one or more of the plurality of sectors; and based at least on the obtained data and the determination of interference level, cause issuance of a request to the network spectrum allocation entity for assignment of a prescribed class of quasi-licensed spectrum to be utilized in a subsequent activation of one or more of the plurality of sectors.

In one variant, the multi-sector base station apparatus comprises a 3GPP-LTE (Long Term Evolution) or 5G NR (New Radio) compliant small-cell operated by a cable, terrestrial or satellite multiple systems operator (MSO), and the network spectrum allocation entity comprises a CBRS SAS (Spectrum Allocation System). In one implementation thereof, the multi-sector base station apparatus comprises one of a cluster or plurality of commonly powered small-cells, and the at least one computer program is further configured to, when executed, cause the wireless base station apparatus to: determine an available electrical power level; and based at least in part on the determined power level; determine an appropriate EIRP level for the subsequent activation of one or more of the plurality of sectors.

In another aspect of the disclosure, a computerized wireless access apparatus configured for providing wireless access to a plurality of computerized wireless-enabled mobile devices via a quasi-licensed portion of a radio frequency (RF) spectrum is disclosed. In one embodiment, the computerized wireless access includes: a wireless interface configured to transmit and receive RF waveforms in two different bands (e.g., PAL and GAA) of the quasi-licensed portion; digital processor apparatus in data communication with the wireless interface; a multi-sector antenna apparatus; and a storage device in data communication with the digital processor apparatus and comprising at least one computer program implementing selective sector evaluation and activation logic.

In one variant, the node comprises a Category A device which operates at or below the 1 W FCC limit. In another variant, the node comprises a Category B device as well. In some implementations, different sectors of the device can be selectively activated as either Category A or Category B devices.

In another variant, the at least one computer program is configured to, when executed by the digital processor apparatus: receive a protocol message from a computerized network node, the protocol message including a information element (IE) directed to the wireless access point specifying PAL or GAA availability in different areas or sectors of the cell, the message causing the wireless access apparatus to select RF carriers for different sectors of the antenna apparatus.

In a further implementation, the wireless access point includes a CBRS (Citizens Broadband Radio Service)-compliant CPE such as an FWA. In another implementation, the wireless access point includes a CBRS-compliant CBSD based on a 3GPP compliant eNB or gNB.

In an additional aspect of the disclosure, computer readable apparatus is described. In one embodiment, the apparatus includes a storage medium configured to store one or more computer programs. In one embodiment, the apparatus includes a program memory or HDD or SSD on a computerized controller device, such as an MSO controller, DP, or SAS entity. In another embodiment, the apparatus includes a program memory, HDD or SSD on a computerized access node (e.g., CB SD/xNB or CPE FWA).

In another aspect, an integrated circuit (IC) device implementing one or more of the foregoing aspects is disclosed and described. In one embodiment, the IC device is embodied as a SoC (system on Chip) device. In another embodiment, an ASIC (application specific IC) is used as the basis of the device. In yet another embodiment, a chip set (i.e., multiple ICs used in coordinated fashion) is disclosed. In yet another embodiment, the device comprises a multi-logic block FPGA device. In some variants, the foregoing IC includes logic implementing selective sector evaluation and activation for a small-cell having multiple sectors.

In a further aspect, a method for providing wireless spectrum assignment is disclosed. In one embodiment, the wireless spectrum being allocated comprises CBRS-band spectrum within the GAA portion and the PAL portion, and the method includes communicating data between at least one CBSD/xNB and a network spectrum allocation process (e.g., SAS). In one variant, the SAS also communicates data relating power availability to the CB SD/xNB so as to further support spectrum selection.

In another aspect of the disclosure, network apparatus for use within a first network is disclosed. In one embodiment, the network apparatus is configured to generate messaging to one or more devices regarding RF carrier assignment plans, and includes: digital processor apparatus; network interface apparatus in data communication with the digital processor apparatus and configured to transact data with the one or more attached devices; and a storage apparatus in data communication with the digital processor apparatus and comprising at least one computer program. In one variant, the network apparatus comprises a CBRS DP (domain proxy) or SAS. In another variant, the network apparatus comprises a managed network controller process (e.g., MSO-based controller owned and operated by the MSO and disposed within the MSO's network architecture.

In a further aspect of the disclosure, a fixed wireless access (FWA) apparatus for use within a wireless network is disclosed. In one embodiment, the FWA apparatus comprises a premises device operated by a network operator (e.g., MSO) that is configured to communicate wirelessly with one or more CBSD/xNB devices to obtain wireless backhaul from the premises. In one variant, the FWA apparatus is configured as a Category B CBSD CBRS device and is mounted on the user's premises so as to enable the aforementioned backhaul for WLAN or wireline interfaces within the premises, and further includes a Category A wireless access point with multi-sector antenna and analysis and scheduling logic. In one variant, the FWA apparatus is integrated with the wireless access point such that at least one of the sectors is used for wireless backhaul to a local CBSD, while the remaining sectors are used for GAA/PAL coverage within a local area (i.e., proximate to the premises where installed).

In another aspect, an antenna apparatus is disclosed. In one embodiment, the antenna apparatus includes a plurality of antenna elements each configured to operate at least within a prescribed frequency band (e.g., 3.55-3.70 GHz). In one variant, the plurality of antenna elements is allocated to sectors in a cell. In one implementation the plurality of antenna elements is configured adaptively according to the user traffic in the sectors in the cell. In another implementation, the central radiation axis of each element is adjustable so as to enable different patterns of coverage by the plurality of sectors in combination.

In a first implementation, the antenna apparatus is configured based on the number of random access requests in the cell sectors. In a second implementation, the antenna apparatus is configured based on the number of handover requests in the cell sectors. In a third implementation, the antenna apparatus is configured based on interference level in each cell sector.

In a fourth implementation, some of the plurality of antenna elements may allocated to "licensed" quasi-licensed band (e.g., PAL), the remaining others the plurality of antenna elements allocated to a non-licensed quasi-licensed band (e.g., GAA).

In yet another implementation, at least one of the antenna elements or sectors is assigned to an outside of a premises or venue, and at least one of the antenna elements or sectors is assigned to serve an interior of the premises or venue.

In a further aspect, a method of operating a wireless access point is disclosed. In one embodiment, the method includes: obtaining an information element (IE) comprising data relating to an RF (radio frequency) carrier within a type of frequency band; allocating the RF carrier to at least one sector in a cell; obtaining the power resources amount available for the at least one sector; depending on the amount of the power resource availability, determining the wireless access point category (e.g., CBSD category A, B); allocating one or more of plurality of antenna elements to the at least one sector in the cell; and causing the modem of the wireless access point to use the RF carrier band on the IE.

In one variant, the IE is generated based at least in part on data received from one of a SAS (Spectrum Access System) or a Domain Proxy (DP) indicating the availability of the RF carrier within a GAA (General Authorized Access) or PAL (Priority Access License) quasi-licensed band. The IE (or another IE) may also contain power availability data generated by e.g., the SAS or DP.

In a further variant, each of plurality of antenna elements or subsets thereof is configured to radiate within a prescribed azimuth value which can be the same or different for different antenna elements. For instance, in some variants, a single element is used to serve a prescribed sector. In another variant, two or more elements are used to serve a single sector, such as through beamforming. In yet a further variant, multiple elements are used to serve multiple sectors.

In a further aspect, a network architecture is disclosed. In one embodiment, the architecture includes: (i) a domain proxy (DP) or controller entity; and (ii) a plurality of Category A and or B wireless access point devices disposed at respective user or subscriber premises. In one variant, the DP/controller negotiates with a SAS to obtain both GAA spectrum allocation(s) and PAL spectrum allocation(s), generates a frequency use plan, and transmits data relating to the allocations relative to the use plan to the various wireless access points so as to implement the frequency use plan using both PAL and GAA spectrum.

In one implementation, only the PAL spectrum is considered in the use plan, and GAA is freely assigned for e.g., indoor uses.

In another implementation, the frequency plan considers one or more clusters of geographically proximate small-cells for purposes of, e.g., mutual interference mitigation and/or coverage overlap.

In yet another aspect, a computerized wireless-enabled user device configured for quasi-licensed band operation is disclosed. In one embodiment, the computerized wireless-enabled user device includes: a wireless data interface configured to utilize at least first and second quasi-licensed radio frequency (RF) spectrum; digital processor apparatus in data communication with the first wireless data interface; and a storage device in data communication with the digital processor apparatus and comprising at least one computer program.

In a further aspect, a method of reducing interference is disclosed. In one embodiment, the method comprises utilizing a first RF spectrum type within a first region of coverage of a multi-sector antenna, and using a second RF spectrum type in a second region of coverage. For instance, the first RF spectrum type may be CBRS GAA spectrum which is expected to be comparatively "polluted" with multiple unlicensed users, and the first region may be an indoor region of a building, the indoor region has a limited number of other possible users and being at least partly shielded from external/exterior unlicensed users. The second RF spectrum (e.g., PAL) is ostensibly more sparsely used, and hence better suited to a higher (prospective) interference environment.

These and other aspects shall become apparent when considered in light of the disclosure provided herein.

BRIEF DESCRIPTION OF THE DRAWINGS

FIG. 4A is a graphical illustration of a first exemplary implementation of the sectorized antenna apparatus of FIG. 4, showing the radiation lobes thereof relative to a comparable omni-directional antenna of the same aggregate EIRP value.

FIG. 4D is a graphical illustration of a third exemplary implementation of the sectorized antenna apparatus of FIG. 4A, showing radiation lobes allocated to different backhaul s.

FIG. 4E is a graphical illustration of a fourth exemplary implementation of the sectorized antenna apparatus of FIG. 4A, showing radiation lobes allocated to PAL and GAL frequency spectrum.

FIG. 5 is a functional block diagram illustrating an exemplary hybrid fiber network configuration useful with various aspects of the present disclosure.

FIG. 6 is a functional block diagram of a first exemplary embodiment of an electrical power domain infrastructure useful with various aspects of the present disclosure.

FIG. 10 is a ladder diagram illustrating communication flow between CB SD/xNB, SAS, and a power management entity according to one embodiment of the disclosure.

Figure 1:
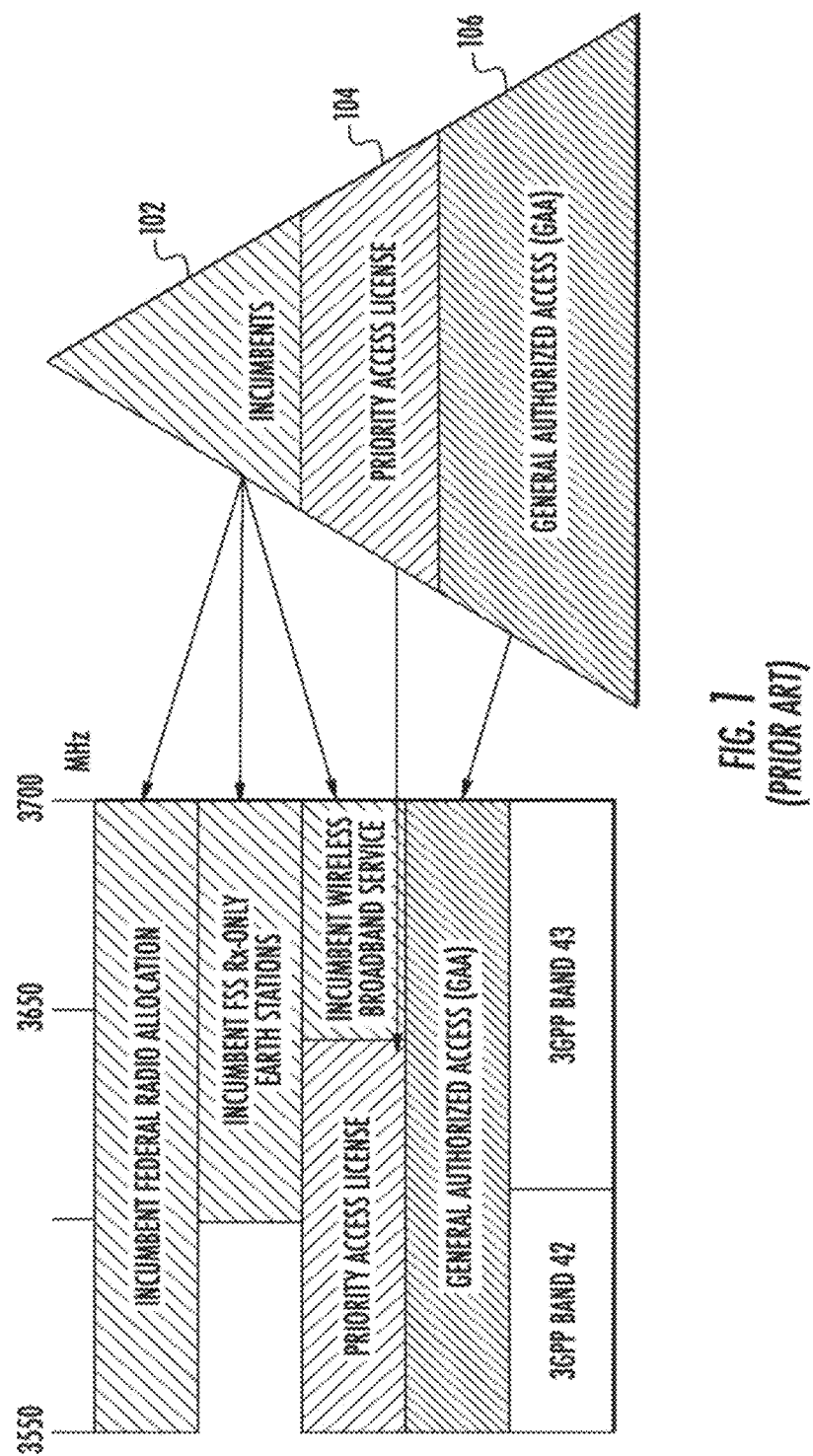
FIG. 1 is a graphical illustration of prior art CBRS (Citizens Broadband Radio Service) users and their relationship to allocated frequency spectrum in the 3.550 to 3.700 GHz band.
Figure 1A:
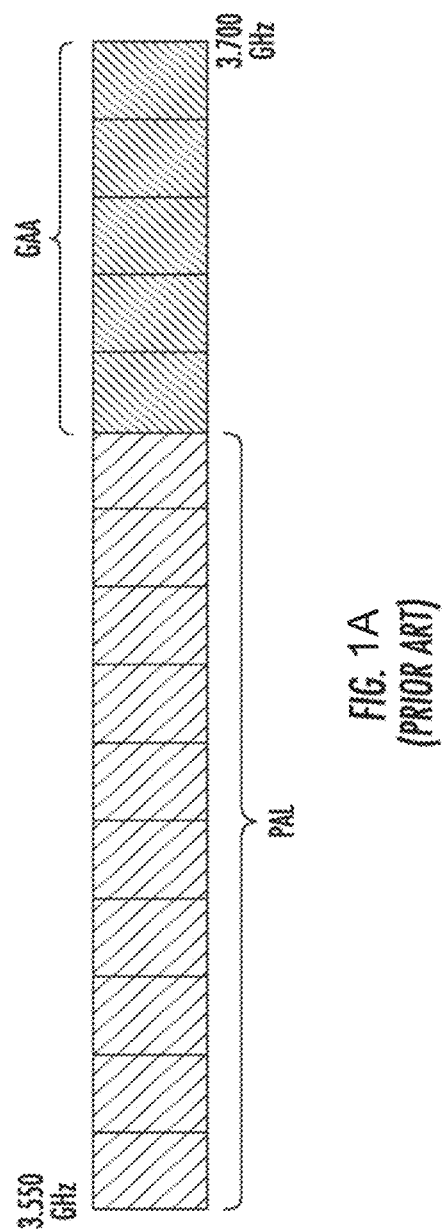
FIG. 1A is a graphical representation of allocations for PAL versus GAA users within the frequency bands of FIG. 1.
Figure 2:
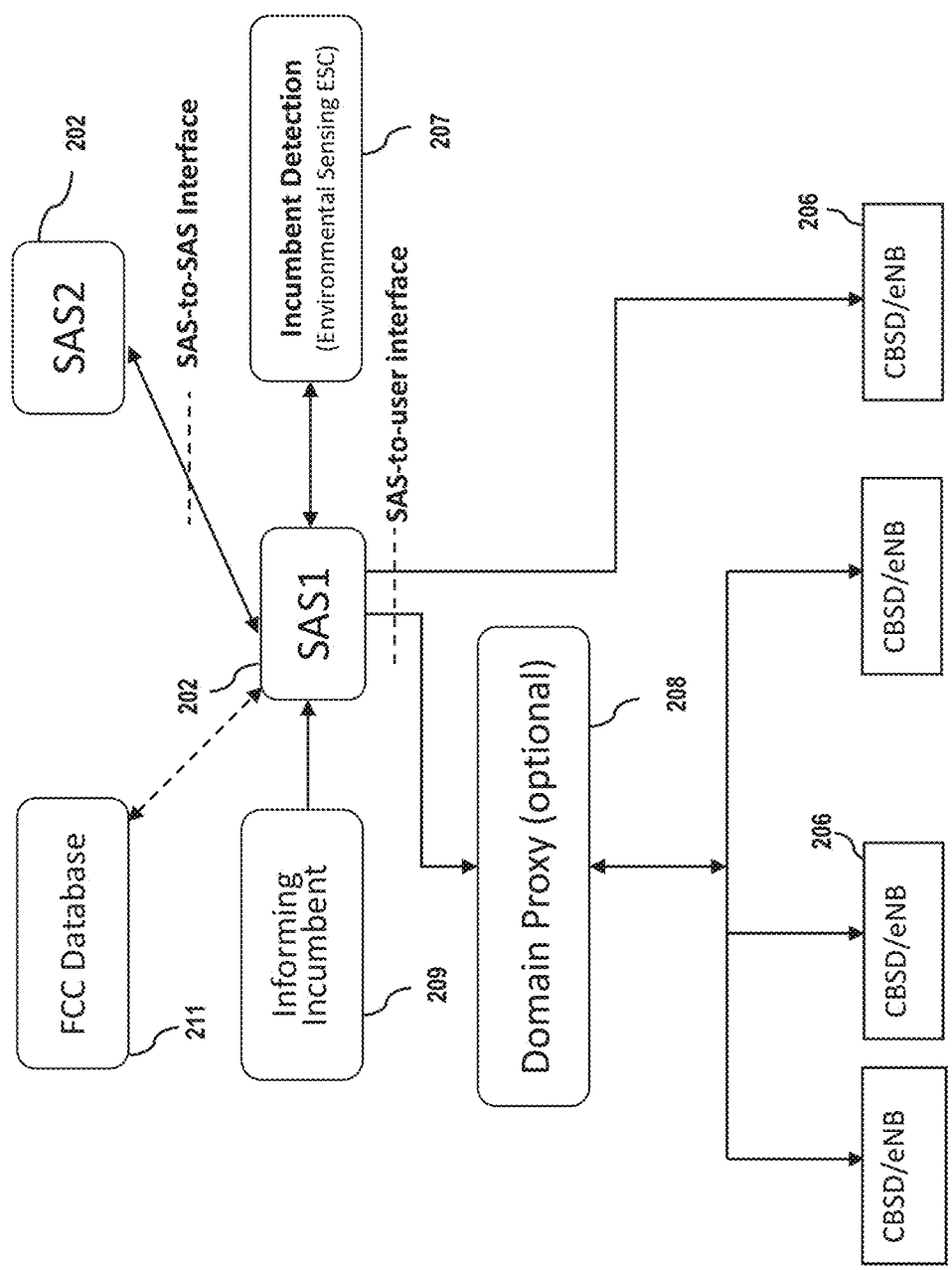
FIG. 2 is a block diagram illustrating a general architecture for the CBRS system of the prior art.

All figures © Copyright 2019-2020 Charter Communications Operating, LLC. All rights reserved.

DETAILED DESCRIPTION

Reference is now made to the drawings wherein like numerals refer to like parts throughout.

Reference is now made to the drawings wherein like numerals refer to like parts throughout.

As used herein, the term "access node" refers generally and without limitation to a network node which enables communication between a user or client device and another entity within a network, such as for example a CBRS CB SD, a Wi-Fi AP, or a Wi-Fi-Direct enabled client or other device acting as a Group Owner (GO).

As used herein, the term "application" (or "app") refers generally and without limitation to a unit of executable software that implements a certain functionality or theme. The themes of applications vary broadly across any number of disciplines and functions (such as on-demand content management, e-commerce transactions, brokerage transactions, home entertainment, calculator etc.), and one application may have more than one theme. The unit of executable software generally runs in a predetermined environment; for example, the unit could include a downloadable Java Xlet™ that runs within the JavaTV™ environment.

As used herein, the term "CBRS" refers without limitation to the CBRS architecture and protocols described in *Signaling Protocols and Procedures for Citizens Broadband Radio Service (CBRS): Spectrum Access System (SAS)—Citizens Broadband Radio Service Device (CBSD) Interface Technical Specification*—Document WINNF-TS-0016, Version V1.2.1.3, January 2018, incorporated herein by reference in its entirety, and any related documents or subsequent versions thereof.

As used herein, the terms "client device" or "user device" or "UE" include, but are not limited to, set-top boxes (e.g., DSTBs), gateways, modems, personal computers (PCs), and minicomputers, whether desktop, laptop, or otherwise, and mobile devices such as handheld computers, PDAs, personal media devices (PMDs), tablets, "phablets", smartphones, and vehicle infotainment systems or portions thereof.

As used herein, the term "computer program" or "software" is meant to include any sequence or human or machine cognizable steps which perform a function. Such program may be rendered in virtually any programming language or environment including, for example, C/C++, Fortran, COBOL, PASCAL, assembly language, markup languages (e.g., HTML, SGML, XML, VoXML), and the like, as well as object-oriented environments such as the Common Object Request Broker Architecture (CORBA), Java™ (including J2ME, Java Beans, etc.) and the like.

As used herein, the term "DOCSIS" refers to any of the existing or planned variants of the Data Over Cable Services Interface Specification, including for example DOCSIS versions 1.0, 1.1, 2.0, 3.0, 3.1 and 4.0.

As used herein, the term "headend" or "backend" refers generally to a networked system controlled by an operator (e.g., an MSO) that distributes programming to MSO clientele using client devices. Such programming may include literally any information source/receiver including, inter alia, free-to-air TV channels, pay TV channels, interactive TV, over-the-top services, streaming services, and the Internet.

As used herein, the terms "Internet" and "internet" are used interchangeably to refer to inter-networks including, without limitation, the Internet. Other common examples include but are not limited to: a network of external servers, "cloud" entities (such as memory or storage not local to a device, storage generally accessible at any time via a network connection, and the like), service nodes, access points, controller devices, client devices, etc.

As used herein, the term "LTE" refers to, without limitation and as applicable, any of the variants or Releases of the Long-Term Evolution wireless communication standard, including LTE-U (Long Term Evolution in unlicensed spectrum), LTE-LAA (Long Term Evolution, Licensed Assisted Access), LTE-A (LTE Advanced), and 4G/4.5G LTE.

As used herein, the term "memory" includes any type of integrated circuit or other storage device adapted for storing digital data including, without limitation, ROM, PROM, EEPROM, DRAM, SDRAM, DDR/2/3/4/5/6 SDRAM, EDO/FPMS, RLDRAM, SRAM, "flash" memory (e.g., NAND/NOR), 3D memory, HBM/HBM2, and PSRAM.

As used herein, the terms "microprocessor" and "processor" or "digital processor" are meant generally to include all types of digital processing devices including, without limitation, digital signal processors (DSPs), reduced instruction set computers (RISC), general-purpose (CISC) processors, microprocessors, gate arrays (e.g., FPGAs), PLDs, reconfigurable computer fabrics (RCFs), array processors, secure microprocessors, and application-specific integrated circuits (ASICs). Such digital processors may be contained on a single unitary IC die, or distributed across multiple components.

As used herein, the terms "MSO" or "multiple systems operator" refer to a cable, satellite, or terrestrial network provider having infrastructure required to deliver services including programming and data over those mediums.

As used herein, the terms "MNO" or "mobile network operator" refer to a cellular, satellite phone, WMAN (e.g., 802.16), or other network service provider having infrastructure required to deliver services including without limitation voice and data over those mediums.

As used herein, the terms "network" and "bearer network" refer generally to any type of telecommunications or data network including, without limitation, hybrid fiber coax (HFC) networks, satellite networks, telco networks, and data networks (including MANs, WANs, LANs, WLANs, internets, and intranets). Such networks or portions thereof may utilize any one or more different topologies (e.g., ring, bus, star, loop, etc.), transmission media (e.g., wired/RF cable, RF wireless, millimeter wave, optical, etc.) and/or communications or networking protocols (e.g., SONET, DOCSIS, IEEE Std. 802.3, ATM, X.25, Frame Relay, 3GPP, 3GPP2, LTE/LTE-A/LTE-U/LTE-LAA, 5G NR, WAP, SIP, UDP, FTP, RTP/RTCP, H.323, etc.).

As used herein, the term "network interface" refers to any signal or data interface with a component or network including, without limitation, those of the FireWire (e.g., FW400, FW800, etc.), USB (e.g., USB 2.0, 3.0. OTG), Ethernet (e.g., 10/100, 10/100/1000 (Gigabit Ethernet), 10-Gig-E, etc.), MoCA, Coaxsys (e.g., TVnet™), radio frequency tuner (e.g., in-band or OOB, cable modem, etc.), LTE/LTE-A/LTE-U/LTE-LAA, Wi-Fi (802.11), WiMAX (802.16), Z-wave, PAN (e.g., 802.15), or power line carrier (PLC) families.

As used herein the terms "5G" and "New Radio (NR)" refer without limitation to apparatus, methods or systems compliant with 3GPP Release 15, and any modifications, subsequent Releases, or amendments or supplements thereto which are directed to New Radio technology, whether licensed or unlicensed.

As used herein, the term "SAS (Spectrum Access System)" refers without limitation to one or more SAS entities which may be compliant with FCC Part 96 rules and certified for such purpose, including (i) Federal SAS (F SAS), (ii) Commercial SAS (e.g., those operated by private companies or entities), and (iii) other forms of SAS.

As used herein, the term "server" refers to any computerized component, system or entity regardless of form which is adapted to provide data, files, applications, content, or other services to one or more other devices or entities on a computer network.

As used herein, the term "storage" refers to without limitation computer hard drives, DVR device, memory, RAID devices or arrays, optical media (e.g., CD-ROMs, Laserdiscs, Blu-Ray, etc.), or any other devices or media capable of storing content or other information.

As used herein, the term "Wi-Fi" refers to, without limitation and as applicable, any of the variants of IEEE Std. 802.11 or related standards including 802.11 a/b/g/n/s/v/ac/ax or 802.11-2012/2013, 802.11-2016, as well as Wi-Fi Direct (including inter alia, the "Wi-Fi Peer-to-Peer (P2P) Specification", incorporated herein by reference in its entirety).

As used herein, the term "wireless" means any wireless signal, data, communication, or other interface including without limitation Wi-Fi, Bluetooth/BLE, 3G (3GPP/3GPP2), HSDPA/HSUPA, TDMA, CBRS, CDMA (e.g., IS-95A, WCDMA, etc.), FHSS, DSSS, GSM, PAN/802.15, WiMAX (802.16), 802.20, Zigbee®, Z-wave, narrowband/FDMA, OFDM, PC S/DCS, LTE/LTE-A/LTE-U/LTE-LAA, 5G NR, analog cellular, CDPD, satellite systems, millimeter wave or microwave systems, acoustic, and infrared (i.e., IrDA).

As used herein, the term "xNB" refers to any 3GPP-compliant node including without limitation eNBs (eU-TRAN) and gNBs (5G NR).

Overview

In one exemplary aspect, the present disclosure provides improved methods and apparatus for providing selective, application-specific wireless coverage via a multi-sector base station, such as one using "quasi-licensed" spectrum provided by the recent CBRS technology initiatives.

Exemplary embodiments of the base station apparatus and supporting methods described herein can advantageously characterize the operating environment of a given base station (including density of users, handover density/rate, RACH requests, and/or interference), and dynamically generate sector-specific activation plans or selections which optimize utilization of the device consistent with SAS-imposed spectrum, radiated power, and physical plant limitations.

In an exemplary embodiment, a sector-configurable base-station for indoor and outdoor coverage is provided. The base station comprises multiple antenna sectors, which can be created and individually managed adaptively and in real-time so as to enhance coverage area, increase quality of service, and/or achieve optimal multi-user capacity. In a first variant, the antenna sectors are created/operated based on one or more parameters relating to e.g., user density, interference, available spectrum, and/or available electrical power (or other physical plant limitations).

For instance, in some configurations, sector instantiation and operation supports various operating scenarios which may be encountered, such as: (i) when the user densities in different sectors of a cell vary significantly, including a number of handover requests on a per-sector basis (or even generally); (ii) when some cell areas may experience higher interference than the other areas; (iii) when the number of handover request coming from a particular direction is higher than the other directions; (iv) when number of random access request from the UEs trying to connect to a CBSD/xNB from some sectors are higher than the other sectors; (v) when GAA or PAL is available on a given sector and not others; and/or (vi) when electrical power or other physical plant limitations are present.

The exemplary configuration described above provides, inter alia, better outdoor coverage due to higher gain and directionality in a given a beam (or group of beams) as compared to an omni-directional antenna, or even prior art multi-sector antenna arrangements. It further allows for better interference control compared with omni-directional antennas that can receive interfering signal equally in all directions, as well as consideration of physical plant limitations such as available electrical power for the small-cell (such as in applications where a group or "cluster" of small-cells are powered from a common electrical infrastructure of limited capacity).

In addition, better signal quality is afforded by the ability to selectively make use of "PAL" spectrum such as in high interference environments. In that GAA spectrum is expected to become highly "polluted" due to unlicensed operation as the technology and deployment thereof evolves, licensed PAL spectrum (which is available for general use only when otherwise unoccupied) is less prone to such interference and can enable higher levels of performance, such as for upper-tier users or subscribers.

Detailed Description of Exemplary Embodiments

Exemplary embodiments of the apparatus and methods of the present disclosure are now described in detail. While these exemplary embodiments are described in the context of the previously mentioned wireless access points (e.g., CBSDs) associated with e.g., a managed network (e.g., hybrid fiber coax (HFC) cable architecture having a multiple systems operator (MSO), digital networking capability, IP delivery capability, and a plurality of client devices), the general principles and advantages of the disclosure may be extended to other types of radio access technologies ("RATs"), networks and architectures that are configured to deliver digital data (e.g., text, images, games, software applications, video and/or audio) via e.g., broadband services. Such other networks or architectures may be broadband, narrowband, or otherwise, the following therefore being merely exemplary in nature.

It will also be appreciated that while described generally in the context of a network providing service to a customer or consumer or end user or subscriber (i.e., within a prescribed venue, or other type of premises), the present disclosure may be readily adapted to other types of environments including, e.g., outdoors, commercial/retail, or enterprise domain (e.g., businesses), or even governmental uses, such as those outside the proscribed "incumbent" users such as U.S. DoD and the like. Yet other applications are possible.

Moreover, while the current SAS framework is configured to allocate spectrum in the 3.5 GHz band (specifically 3,550 to 3,700 MHz), it will be appreciated by those of ordinary skill when provided the present disclosure that the methods and apparatus described herein may be configured to utilize other "quasi licensed" or other spectrum, including without limitations above 4.0 GHz (e.g., currently proposed allocations up to 4.2 GHz), C-Band, NR-U, or yet other types of spectrum (including mmWave frequencies above e.g., 40 GHz).

Additionally, while described primarily in terms of GAA 106 spectrum and PAL 104 allocation (see FIG. 1), the methods and apparatus described herein may also be adapted for allocation of other "tiers" or sub-tiers of CBRS or other quasi-licensed or unlicensed spectrum such as those referenced above (whether in relation to GAA/PAL spectrum, or independently).

Moreover, while various aspects of the present disclosure are described in detail with respect to so-called "4G/4.5G" 3GPP Standards (aka LTE/LTE-A), such aspects—including allocation/use/withdrawal of CBRS spectrum and other features described herein are generally access technology agnostic and hence may be used across different access technologies, including without limitation so-called 5G "New Radio" (3GPP Release 15 and TS 38.XXX Series Standards and beyond), as well as MulteFire.

Other features and advantages of the present disclosure will immediately be recognized by persons of ordinary skill in the art with reference to the attached drawings and detailed description of exemplary embodiments as given below.

Multi-Sector Antenna and Base Station Architecture—

Figure 3:
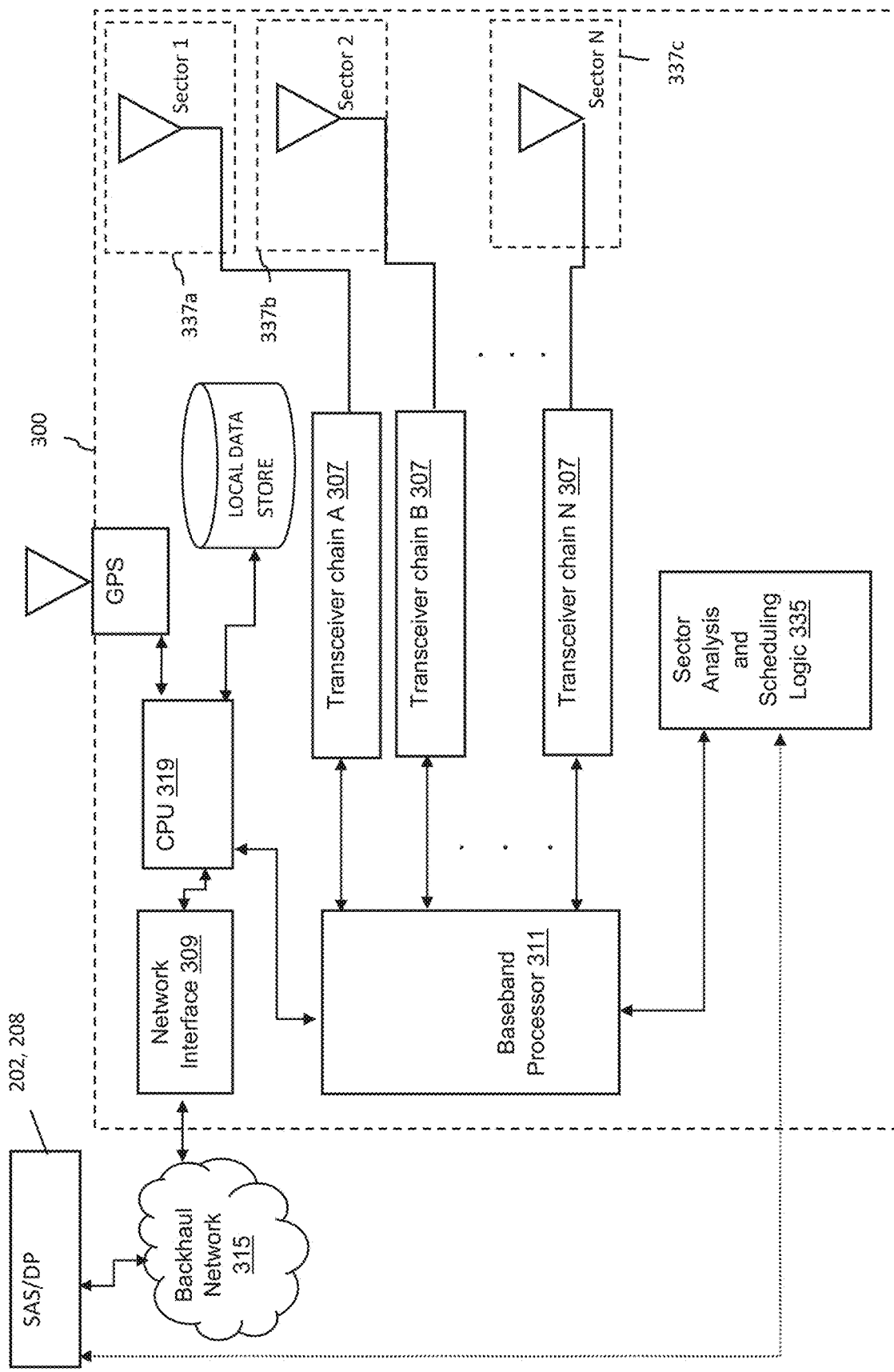
FIG. 3 is a block diagram illustrating an exemplary embodiment of a Citizens Broadband radio Service Device (CBSD) or CBSD/xNB base station apparatus according to the present disclosure.

FIG. 3 illustrates one embodiment of a multi-sector antenna base station transmitter architecture 300 according the present disclosure. It will be appreciated that while exemplary wireless base station or access point apparatus are described herein (e.g., CBRS CBSDs or xNBs), the various aspects of the present disclosure can readily be adapted for use on devices which act as clients or user devices. For instance, CBRS fixed wireless apparatus (FWA) can be configured using the sectorized approaches described herein, such that certain sectors are used for backhaul to a service base station or CBSD, while other sectors serve local UE or other devices as comparatively reduced power levels (e.g., as a Category A CBSD).

In one variant, the device 300 of FIG. 3 includes one or more network interfaces 309, baseband processor 311, CPU 319, multiple transceiver chains 307 including inter alia, D/A and A/D conversion apparatus, RF front end (e.g., mixers and other related components as required for the particular technology used for the underlying air interface), power amplifier (PA), and sector analysis and scheduling logic 335. Individual antenna sectors 337*a-c* (each comprising one or more individual antenna elements) are used to transmit the generated RF signals, as well as receive signals from e.g., user devices such as 3GPP-enabled UE operating in unlicensed/quasi-licensed bands. Exemplary embodiments of the apparatus 300 make use of software-defined radio transceivers that allow, among other things, dynamically configurable bands and channels on all sectors.

It will be appreciated that the components of the device 300 may be individually or partially implemented in software, firmware and/or hardware, and may take on any number of different architectures supporting different multiple access technology (such as e.g., the OFDM-based architecture shown in the example of FIG. 3A described subsequently herein).

In the illustrated embodiment, the base station 300 is configured as a CBRS CBSD (i.e., which is compliant with CBRS standards and which is configured to operate in 3.550 to 3.700 Ghz range, including General Authorized Access (GAA) spectrum as well as well as Priority Access License (PAL) spectrum), and utilizes 3GPP-based technology as the underlying wireless access/air interface technology.

The network interface 309 connects the device 300 to various network entities such an MSO CBRS or HFC network via a backhaul such as a DOCSIS modem or optical fiber (see FIG. 6).

The illustrated base station 300 includes a baseband processor module 311 which processes the digital domain signal (baseband) to be transmitted via the relevant sector(s) to e.g., UEs or CBRS FWA apparatus, as well as processing received signals. For transmission, to RF front end 305 converts the baseband signal to radio frequency signal (e.g., GAA or PAL spectrum), and may include an up-conversion (e.g., to IF) in some architectures. The PA (not shown) converts the low power RF (analog domain) signal from the RF front end 305 into a higher power radio frequency signal at transmission frequency to drive one or more of the antenna sectors.

The analytics and scheduler logic 335 is used to provide a number of different local functions in support of sector evaluation and utilization, including processing data relating to one or more of: (i) handovers and associated cell values (e.g., PCIs), (ii) interference in various served sectors, (iii) availability of GAA and/or PAL spectrum; (iv) electrical power or other physical plant limitations; (v) neighboring or "clustered" small cells and their operational configuration/ grants; and/or (vi) user or traffic density associated with various of the sectors.

It will be appreciated that the analysis and scheduler logic 335 can be integrated in any of network components or implemented as a separate device in the network. In one implementation, the logic 335 may be implemented entirely in the base station (e.g., CB SD/xNB), including within sub-portions thereof (see e.g., FIGS. 5A and 5B herein, wherein varying 3GPP 5G NR gNB CU/DU architectures are adapted to the functionality of the present disclosure).

In another implementation the logic 335 may be implemented in a network controller, such as one at a local or edge node of the network operator's network (e.g., MSO HFC network), or even a core or headend portion thereof—see FIG. 6.

In other implementations, the network logic and local (base station) logic are utilized, with the two processes in data communication with one another over the base station backhaul (e.g., DOCSIS channel(s)); e.g., such as via a distributed application or distributed processes executing in different environments.

Figure 3A:
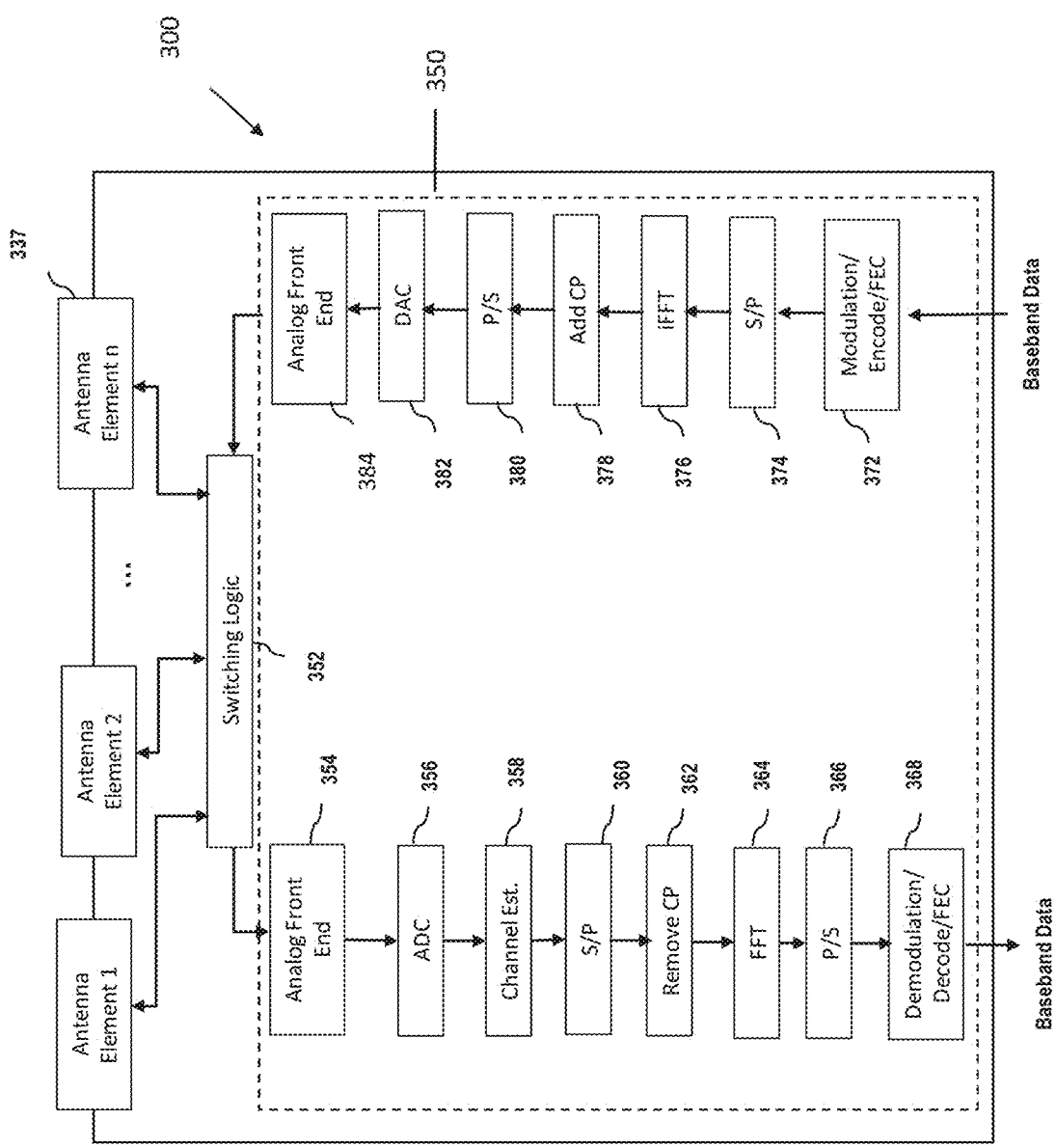
FIG. 3A is a functional block diagram illustrating one implementation of the radio apparatus of FIG. 3, showing OFDM-based transmitter/receiver chains.

FIG. 3A illustrates one particular implementation of the architecture of an RF transceiver 350 used in the base station apparatus 300. It will be appreciated that while an OFDM-based radio apparatus having switched receiver and transmitter chains is shown, the present disclosure is in no way limited to either OFDM modulation/access schemes, nor switched chains (or for that matter discrete chains).

As shown in FIG. 3A, the antenna element(s) of the sectors 337 are accessed by the transmitter or receiver chains via a switching matrix 352. For instance, in one variant, the switching matrix 352 allows two elements 337 to be accessed by the same chain simultaneously, while other elements 337 are not accessed thereby (see FIG. 3D). Alternatively, individual antenna elements can be accessed individually by respective ones of the chains (FIG. 3B). For instance, as discussed elsewhere herein, TDM-based switching may be used for selective scheduling and/or selective sector activation or beamforming in some approaches, and/ or two or more antenna sectors can be "ganged" such as to support e.g., enhanced spatial coverage or spatial diversity.

It will be recognized that the switching logic in this embodiment selectively channels the transmit signal to the various sector(s) 337 based on the inputs from the analytics and scheduler logic 335; however, for the receive operations, the exemplary embodiment may or may not utilize coordination with the operation of the transmitter(s), other than that associated with the underlying radio protocols. In many cases, the temporal duration of the activation or scheduling for a given sector is typically significantly longer that any "transmit/receive" processes with timeouts, such as e.g., HARQ, the latter which may complete in a very short period comparatively. It will be recognized, however, that some level of coordination between transmit activation or scheduling and receive operations may be employed if desired, consistent with the disclosure. For instance, activated antenna sector(s) may both transmit and receive when active, and perform neither when de-activated.

It will further be recognized that the switching logic 352 may also be controlled by an FPGA (e.g., one or more configurable logic blocks or CLBs thereof) or other logic, so as to effectuate the desired utilization of the antenna element(s) and/or transmitter/receiver chains of each base station.

In the receiver chain, analog OTA signals are received by the antenna element(s) 337 and switched to the receiver via the switch 352, where they are received by the analog front end 354. They are filtered, down-converted (as needed) such as via IF mixer logic, and converted to the digital domain by the ADC 356. Channel estimation is performed in the CE 358, and serial-to-parallel conversion applied 360. Cyclic prefixes are removed at the CP logic 362, and an FFT 364 applied to transfer the signals from the time domain t frequency domain. Parallel to serial conversion is then applied 366, and the resulting signals demodulated, decoded, and any FEC 368 applied (e.g., Turbo or LDPC) to extract the baseband data.

Conversely, in the transmitter chain, the FEC, encoding, and modulation are applied 372, S/P conversion performed 374, IFFT applied 376, CP added 378, P/S conversion applied 380, and the resulting data is then converted to the analog domain per the DAC 382 for processing by the analog front end 384 and transmission via the antenna element(s) 337 by way of the PA, and the switching logic 352.

It will also be appreciated that in some embodiments, utilization of a "scheduled" transmission from each of the different sectors (or groups of sectors) of the base station may be utilized. For instance, exemplary methods and apparatus for scheduling transmissions are described in co-owned and co-pending U.S. patent application Ser. No. 16/854,689 filed Apr. 21, 2020 and entitled "SCHEDULED AMPLIFIER WIRELESS BASE STATION APPARATUS AND METHODS," which is incorporated herein by reference in its entirety, although other methods and apparatus may be used consistent with the present disclosure. Notably, some reduction in cross-sector or mutual interference may be obtained as compared to prior art approaches through utilization of some level of transmit chain coordination or scheduling. Such coordination may include for instance limiting the ability of adjacent spatial sectors (e.g., those contiguous in azimuth) to transmit simultaneously. While interference due to external transmitters (e.g., other CBSDs or UEs with which the BS is communicating or otherwise exposed to) is limited and addressed by other mechanisms described herein, control of the different sectors of the inventive BS can reduce interference caused by one transmitting sector not "polluting" its adjacent sectors while such adjacent sectors are also transmitting (due to e.g., side or back lobes of the antenna which may be mitigated but often not completely eliminated). Since 100% throughput capability is rarely if ever required for all sectors simultaneously, intelligent management of sector "coordination," whether on an inter-base station or intra-base station basis (e.g., where two or more small-cells are operated by the same operator in comparatively close proximity such that they may interfere with each other when certain sectors of one base station are utilized in conjunction with certain sectors of another base station), can be used to mitigate such interference without undue impact on capacity or throughput of the device(s). In cases where to potentially conflicting sectors of one or more base stations must be utilized, other mechanisms as described herein may be used as well, such as e.g., obtaining one or more grants for PAL spectrum which is typically much less encumbered by interference.

Moreover, in some implementations, power amp (PA) "sharing" such as that described in the aforementioned U.S. patent application Ser. No. 16/854,689 filed Apr. 21, 2020 and entitled "SCHEDULED AMPLIFIER WIRELESS BASE STATION APPARATUS AND METHODS" may be used within the base station 300 so as to reduce design and fabrication cost.

Figure 4:
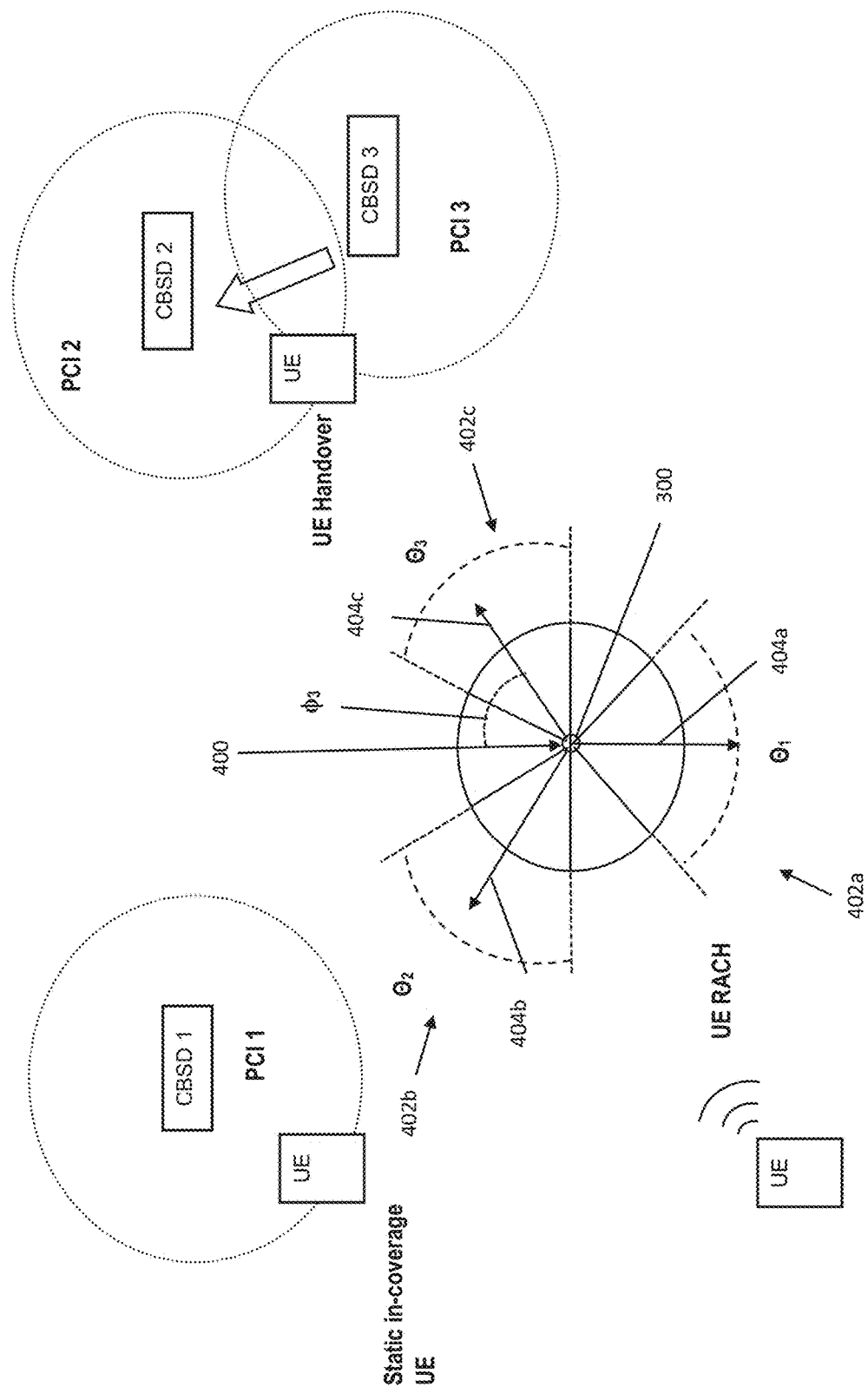
FIG. 4 is a plan view of one exemplary embodiment of a sectorized antenna apparatus according to the present disclosure.

FIG. 4 is a plan view of one exemplary embodiment of a sectorized antenna apparatus useful with various aspects of the present disclosure, showing relative sectors for reference purposes, as well as various scenarios for nearby devices or environments. As shown, the apparatus 300 includes a plurality of sectors 402a-c each with a corresponding radiator element with azimuth angle of coverage ($\theta_n$), with a central axis or lobe vector 404a-c associated therewith, each lobe axis 404a-c disposed at a polar angle of $\phi_n$. It will be appreciated that, as exemplified by the various examples described below with respect to FIGS. 4A-4G: (i) the number of sectors can be varied; (ii) the azimuth coverage of each sector may be varied and/or non-uniform across the sectors; (iii) the polar angle of each center axis may be varied and/or non-uniform across the sectors; (iv) The EIRP or radiated power of each sector may be varied and/or non-uniform across the sectors; (v) the shape of the lobe for each sector may be varied and/or non-uniform across the sectors; (vi) the frequency/carrier assignments of each lobe may be varied and/or non-uniform across the sectors; (vii) intra-sector (lobe) spatial diversity may be used (e.g., a given sector can utilize two sub-elements for spatial diversity purposes) and/or non-uniform across the sectors; and (viii) inter-sector (lobe) spatial diversity may be used; e.g., two or more sectors can be utilized for spatial diversity purposes, such as for beamforming, increased coverage via allocation of redundant data streams to multiple sectors, or increased throughput via allocation of two or more different data streams to respective different sectors.

As shown in FIG. 4 and discussed in greater detail below with respect to FIGS. 7-9, the various devices which the CB SD 300 may be in proximity to at any given time include other CBSDs (here CBSDs 1, 2 and 3), as well as various stationary or moving UE. Some of these UE may be static (i.e., connected to a given CBSD and generally not moving out of cell coverage), moving for handover from cell to cell (e.g, PCI 3 to PCI 2 as shown), or unconnected and requesting random access via established protocols (e.g., 3GPP RACH or similar). Exemplary embodiments of the base station apparatus 300 described herein can advantageously characterize its environs (including density of users, handover density/rate, RACH requests, and/or interference), and dynamically generate sector-specific activation plans or selections which optimize utilization of the device 300 consistent with SAS-imposed spectrum and EIRP and electrical power limitations.

FIG. 4A is a graphical illustration of an exemplary implementation of a multi-sector or lobed sectorized antenna apparatus such as that of FIG. 4, showing the radiation lobes thereof relative to a comparable omni-directional antenna profile 415 of the same aggregate EIRP value. As shown, since power is radiated only (primarily) within the 8 lobes shown or subsets thereof, greater lobe coverage (radius) is achieved for the same total EIRP.

In one implementation, the (diagrammatically) antenna lobes 413 are allocated to different cell sectors uniformly, such that each cell sector will receive power from CBSD/xNB equally. Each of the antenna lobes 413 may be turned on or off according to e.g., user density, interference in the sectors, number of handovers, number of random access requests, spectrum availability, backhaul capacity, power resource availability, nearby small-cells within a common cluster, etc. as previously referenced, and discussed in greater detail subsequently herein. In addition, the lobe shape and width at each sector may be changed adaptively according to any change in the above mentioned conditions.

In one exemplary embodiment, the apparatus 410 of FIG. 4A uses reconfigurable antenna elements that would allow for inter alia, individual change of azimuth, polar angle, and element tilt. For instance, in one variant, each element is mounted on a two-axis (degree of freedom) mount such that it can be rotated in the azimuth plane ($\phi$) as well as in a vertical dimension. Change in azimuth coverage ($\theta$) can be provided using any number of means, such as e.g., use of different size/shape antenna elements or waveguides.

Furthermore, the unit may be adjusted vertically (height) via e.g., an attached extensible stand, or placement on a wall-mounted bracket or tray, or even suspended from or mounted to an overhead such as a ceiling.

Figure 4B:
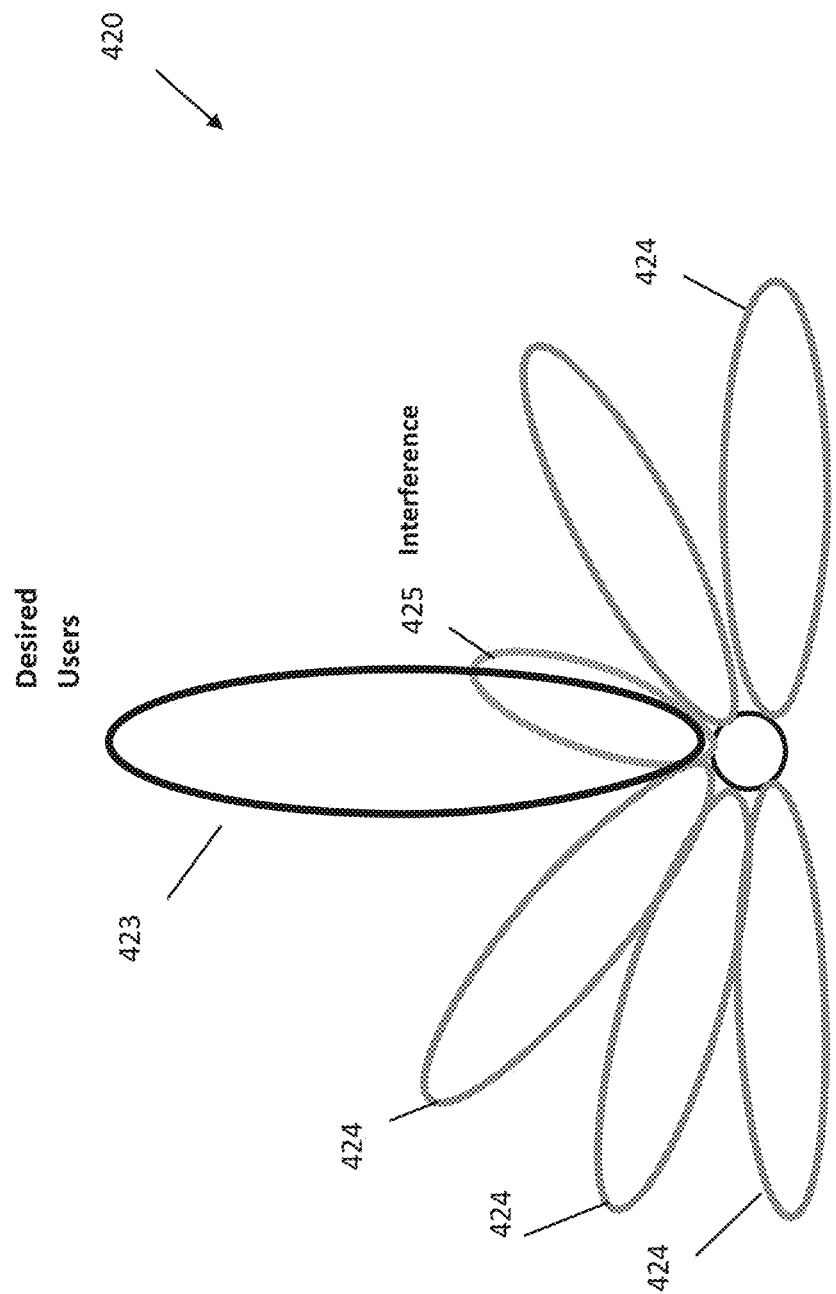
FIG. 4B is a graphical illustration of one implementation of the sectorized antenna apparatus of FIG. 4A, showing the radiation lobes thereof including a lobe shaped to null the interference in a sector.

FIG. 4B is a graphical illustration of a second exemplary implementation of the sectorized apparatus of FIG. 4, showing the radiation lobes thereof created so as to maximize the signal-to-interference (e.g., SINR) in one sector. As shown, there is in this scenario a strong interference source 425 in one sector (e.g., another CB SD or radiator), and hence the antenna lobe 423 in that sector is optimized (steered or beamformed, as well as enhanced in transmit power) to maximize the energy towards the desired users in that sector, and null or offset the interference to the maximum degree practicable. It will be appreciated that the foregoing process may be dynamic as well; e.g., the interference source may move with time (e.g., the lobe 425 may change in azimuth), and hence the main user lobe 423 can be steered or formed at an appropriate angle, and power adjusted, so as to maintain a desired useful signal level for the users.

Figure 4C:
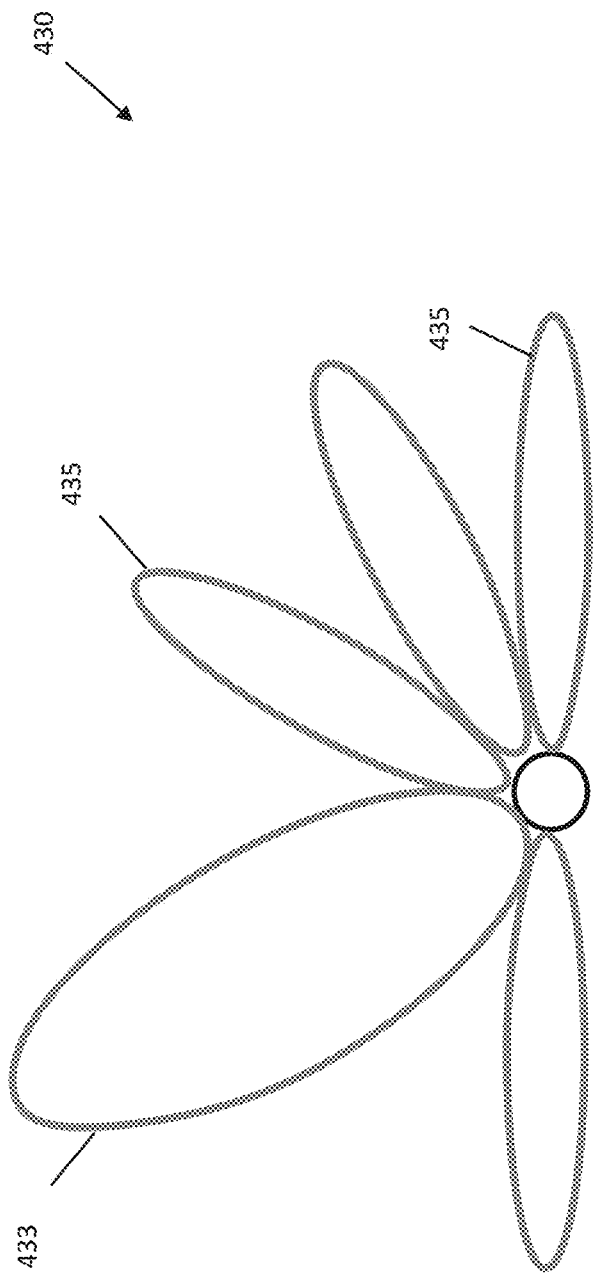
FIG. 4C is a graphical illustration of a second exemplary implementation of the sectorized antenna apparatus of FIG. 4A, showing the radiation lobes thereof including a lobe shaped for a high traffic sector.

FIG. 4C is a graphical illustration of another exemplary implementation of the sectorized antenna apparatus of FIG. 4, showing radiations lobes with asymmetric power relative to the radiation lobes 410 of FIG. 4A. As shown, one lobe 433 in this example is shaped to radiate more power and cover wider area (dispersion) than the other lobes 435. In one implementation, the lobe 433 is associated with a cell sector where the user density in that sector is higher than the sectors associated to the other lobes 435.

Similarly the lobe 433 can be associated to a cell sector where the number of handovers in that in that sector are higher than the sectors associated to the lobes 435, and/or where the number of random access request in that in that sector are higher than the sectors associated to the lobes 335.

FIG. 4D is a graphical illustration of another exemplary implementation of the sectorized antenna apparatus of FIG. 4, showing radiation lobes or sectors which are assigned to different backhauls.

As a brief aside, different sectors of a cell may in some use cases be operated by different network operators, and different backhauls may be assigned to different sectors of the cell. For instance, in a business premises or venue (i.e., a café or hotel) with both indoor and outdoor components or portions, which provide heterogeneous coverage indoor and outdoor, the user traffic inside the premises may be be different than the outside of the premises. Moreover, users situated beyond the outdoor premises boundary (for instance across the street or a block away) who are presumably not customers of the small business may require provision of wireless service. Therefore, the cell sectors outside of the premises may be assigned to an MNO backhaul (i.e. 4G/5G network operator), while the sectors inside the venue may be assigned to an MSO backhaul. Allocating the users in different areas of a cell to different backhauls requires some consideration of antenna pattern and sector optimization according to the associated user traffic in different areas of the cell, so as to optimize coverage area and multi-user capacity.

As shown in the exemplary implementation of FIG. 4D, the lobes 441 and 445 are allocated to a first backhaul 444, and lobe 443 is allocated to a second backhaul 446. The first and second backhauls 446 and 444 may be operated by the same or different network operators, and may be heterogeneous in nature (e.g., one wireless, one wireline, etc.).

The allocation of antenna sectors to different backhauls in one embodiment is dependent on the backhaul capacity. For instance, in one implementation, the lobes 441, 445 may be allocated to the outside of the premises where user density may be highest, while the other lobe 443 may be allocated to the inside of the premises where density may be lower (or vice versa). In one scenario, the antenna sectors 441 radiate power to serve users as shown, and are connected to an MNO backhaul 444, such as wirelessly via a CBRS Category A, B or IEEE Std. 802.16 base station, or 3GPP 5G NR gNB operating within licensed or quasi-licensed spectrum. In the illustrated embodiment, the central (outdoor) lobe comprises the wireless backhaul (i.e., the lobe 445 is pointed toward its serving cell or CBSD/xNB), while the "indoor" antenna sector 443 radiates power from the CB SD/xNB and is backhauled via a DOCSIS cable modem or other type of wireline backhaul (see discussion of FIG. 6 herein), via an HFC cable network. Additionally, the outdoor/indoor lobes may have asymmetric power as shown, or symmetric power, and may be varied dynamically as previously described.

FIG. 4E is a graphical illustration of a further exemplary implementation of the sectorized antenna apparatus of FIG. 4, showing different radiation lobes allocated to GAA and PAL frequency spectrum. As shown, since in some sectors GAA spectrum is available, the antenna lobe 455 is created and assigned to GAA spectrum. In the other sectors where the PAL spectrum is available, the lobes 453 are assigned to PAL spectrum. As discussed elsewhere, the assignment of GAA vs. PAL spectrum may be based on e.g., (i) spatial considerations, such as where one type of spectrum is better suited to one spatial application versus the other (e.g., the interior of a premises may be best suited for low-power, unlicensed GAA while PAL is better suited for external, longer-range applications), (ii) user/data application considerations, such as for different tiers of subscribers, different QoS or latency requirements, or similar; (iii) different interference environments (e.g., PAL, being restricted in users, necessarily is "cleaner" and hence generally performs better in higher interference environments); and/or (iv) available power (e.g., the CBSD 300 may be limited in electrical power, and hence can only sustain Category A operation which may lend itself better to one type of spectrum versus another.

Figure 4F:
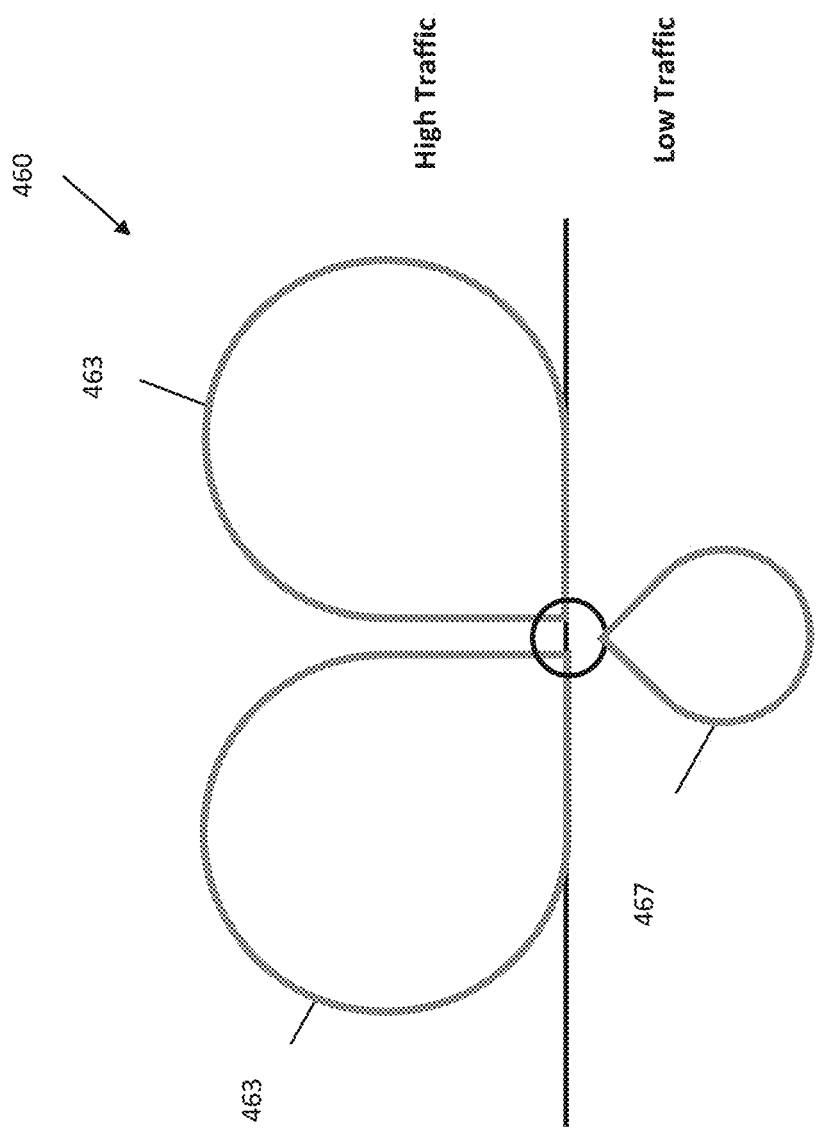
FIG. 4F is a graphical illustration of a fifth exemplary implementation of the sectorized antenna apparatus of FIG. 4A, showing radiation lobes allocated to high traffic and low traffic sectors.

Similarly, FIG. 4F illustrates allocation 460 based on traffic (e.g., total user throughput). In this instance, the higher traffic sectors 463 may be allocated higher transmit power (as shown by the asymmetric sized lobes relative to the low traffic sector(s) 467. Note that this can also be combined with PAL/GAA assignment; e.g., higher traffic sectors can also be allocated "cleaner" PAL spectrum since mutual interference between the higher user density (presumed to be proportional to the traffic load) is also presumed to be higher.

Figure 4G:
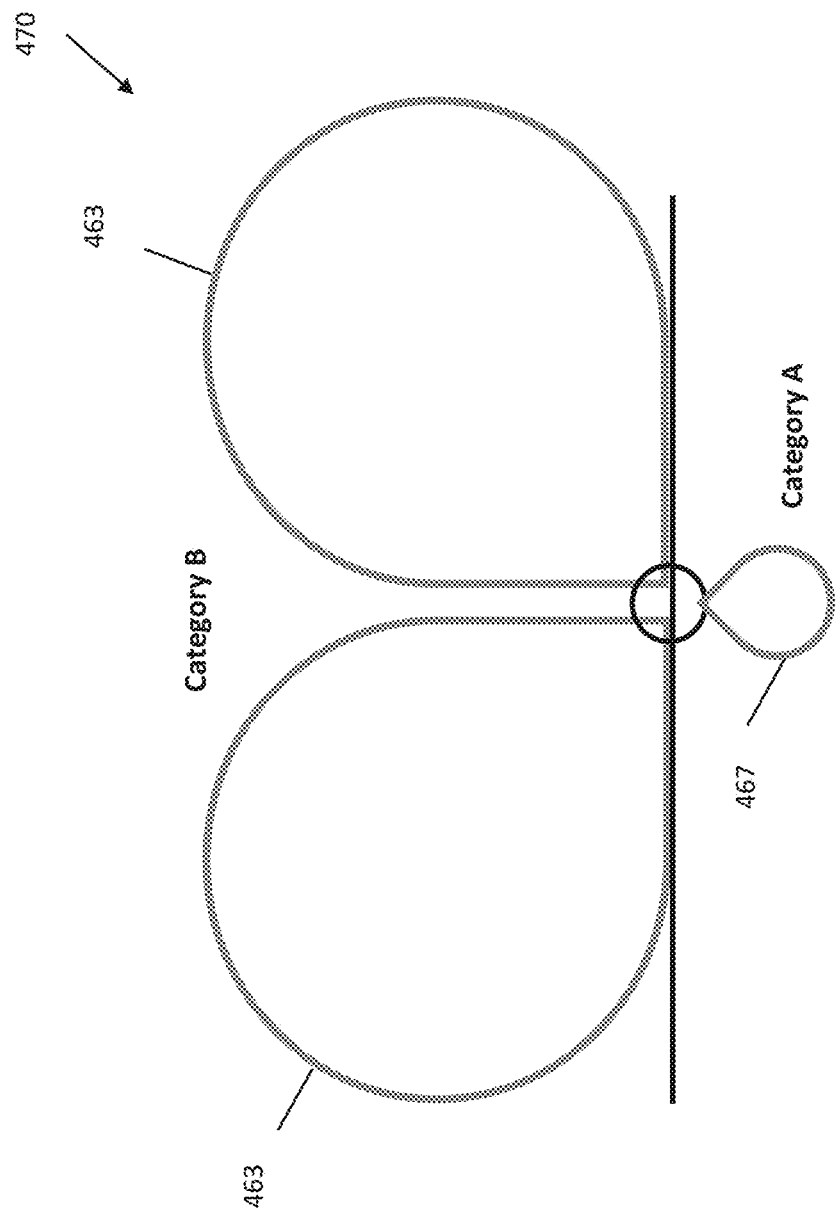
FIG. 4G is a graphical illustration of a sixth exemplary implementation of the sectorized antenna apparatus of FIG. 4A, showing radiation lobes allocated to Category A and B CBSD.

FIG. 4G is a graphical illustration of another exemplary implementation of the sectorized antenna apparatus of FIG. 4, showing radiation lobes with asymmetric power relative to the radiation lobes 410 of FIG. 4A allocated to CBSD/xNBs with Category A and B. In this implementation, the allocation of the lobes to CB SD/xNB category A and B is determined based on available power resource at each sector. For instance, as shown, the lobes 463 are allocated to a category B (EIRP<47 dBm), and lobe 467 is allocated to a category A (EIRP<30 dBm).

Service Provider Network—

FIG. 5 illustrates an exemplary MSO network architecture for the delivery of packetized data (e.g., encoded digital content or other data carried within a packet or frame structure or protocol) within which the base station apparatus 300 may be used.

It will be appreciated that while described with respect to such network configuration, the methods and apparatus described herein may readily be used with other network types and topologies, whether wired or wireless, managed or unmanaged. Therein further lies another advantage of the inventive base station; i.e., by being commoditized and widely distributable to varying types of customers/subscribers, it can be used in conjunction with a variety of different types of backhauls available at the subscriber's premises to significant effect with a minimum of complexity.

The exemplary service provider network 500 is used in the embodiment of FIG. 5 to provide backbone and Internet access from the service provider's wireless access nodes (e.g., CBSD/xNBs, Wi-Fi APs, FWA devices or base stations operated or maintained by the MSO), and one or more stand-alone or embedded cable modems (CMs) 533 in data communication therewith. In the illustrated deployment of FIG. 5, the base stations 300 are configured as CB SD/xNB devices operating using unlicensed/quasi-licensed spectrum, such as to serve customers of a small business concern (e.g., pizza or coffee shop) via their technology-compliant handsets or tablets 511, 513, or to serve non-business subscribers at e.g., an expansive home or agricultural property. Numerous other applications will be recognized by those of ordinary skill.

The individual CB SD/xNBs 300 are backhauled by the CMs 533 to the MSO core via e.g., CMTS or CCAP MTIAv2/RPD or other such architecture, and the MSO core 519 includes at least some of the EPC/5GC core functions previously described, as well as an (optional) analytics and scheduler controller process 521 as shown. The controller process is one embodiment a network-based server which communicates with the various devices 300 so as to effect various functions including the selective sector evaluation and activation/deactivation scheduling logic described elsewhere herein. As previously referenced, the controller 519 (which may be e.g., an 5G NR CUe per FIG. 5B) can communicate with the base stations 300 via the primary backhaul (DOCSIS) when operational.

Moreover, the base stations 400 may also communicate with CPE/FWA 1005, or the base stations 300 themselves may assume the role of CPE/FWA, such as where the base station uses e.g., one sector to communicate with a parent or serving CBSD (using e.g., PAL), and other sectors for serving local users/UE via e.g., GAA spectrum. In such cases, client devices 511 such as tablets, smartphones, SmartTVs, etc. at each premises are served by respective WLAN routers 507, CPE/FWA 505, or directly by the CBSD/xNB.

Distributed gNB Architectures—

Figure 5A:
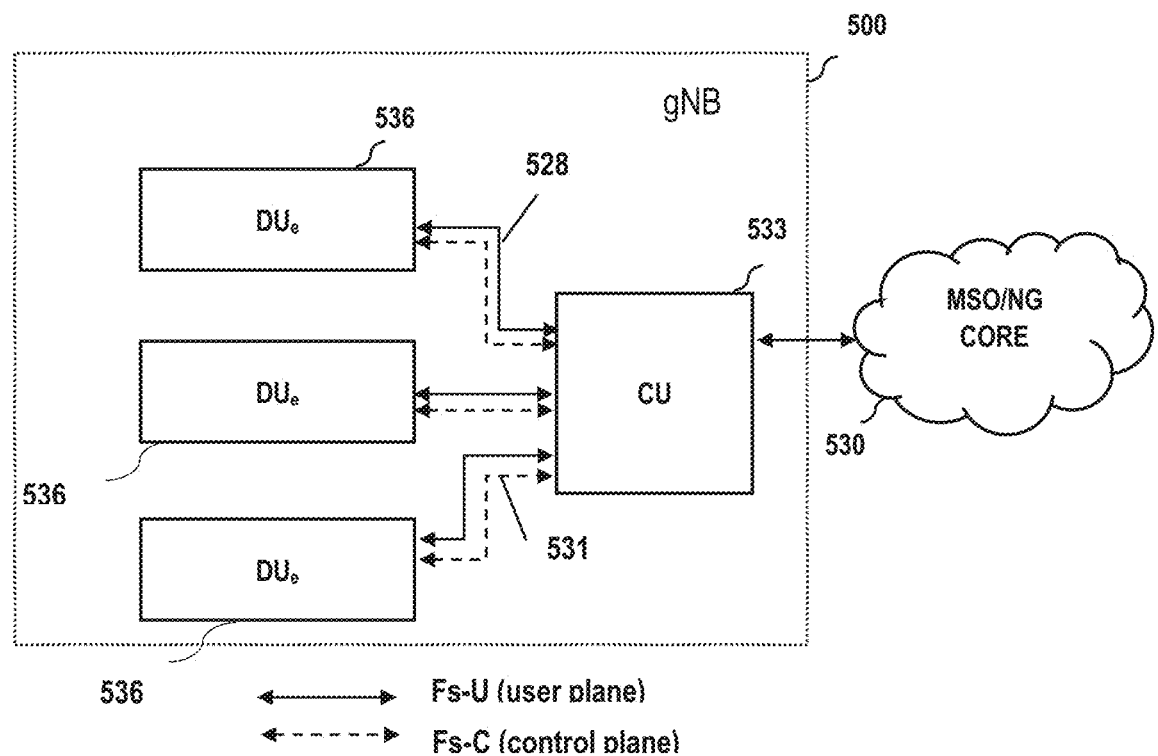
FIG. 5A is functional block diagram illustrating one implementation of the base station apparatus as a 3GPP gNB with enhanced DU (DUe).
Figure 5B:
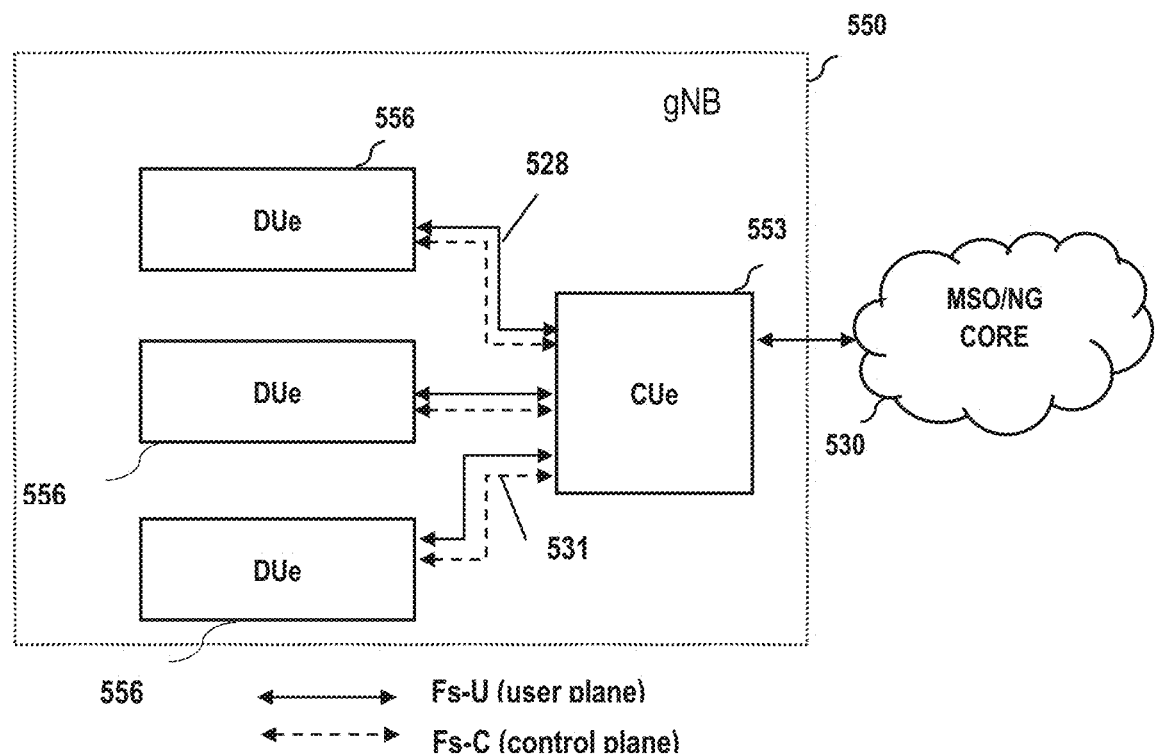
FIG. 5B is functional block diagram illustrating one implementation of the base station apparatus as a 3GPP gNB with enhanced CU (CUe).

Referring now to FIGS. 5A and 5B, various embodiments of a distributed (CU/DU) gNB architecture according to the present disclosure are described. As previously noted, in some implementations, the base station 300 of FIG. 3 may be configured as a 3GPP 5G NR compliant gNodeB (gNB). As such, multiple distributed units (DUs) within the gNB model may be coordinated or controlled by a common controller unit (CU). In some variants, the base station 300 previously described may be embodied as one of the multiple controlled DU (i.e., a DUe or enhanced DU) deployed at e.g., a venue or customer premises as a group (e.g., two or more) small-cells each with, inter-alia, selective multi-sector capabilities as described herein (FIG. 5A). Alternatively, functions of the base station 300 such as the sector analysis and scheduling logic 335 may be embodied within an enhanced CU (DUe) which may be disposed locally or remote from the controlled DU (FIG. 5B).

As shown in FIG. 5A, a first architecture 500 includes a gNB 500 having a CU (CU) 533 and a plurality of enhanced DUs (DUe) 536. As described elsewhere herein, these enhanced entities are enabled to permit efficient sector evaluation and instantiation/teardown, scheduling, and even inter-DUe coordination, whether autonomously or under control of another logical entity (such as the CU, or NG Core 530 with which the gNB communicates, or components thereof).

The individual DUe's 536 in FIG. 5A communicate data and messaging with the CU 533 via interposed physical communication interfaces 528 and logical interfaces 531. Such interfaces may include a user plane and control plane, and be embodied in prescribed protocols such as F1AP. It will be noted that in this embodiment, one CU 533 is associated with one or more DUe's 536, yet a given DUe is only associated with a single CU. Likewise, the single CU is communicative with a single NG Core, such as that operated by an MNO or MSO. Each NG Core 530 may have multiple gNBs 500 associated therewith.

In the architecture 550 of FIG. 5B, the gNB includes sectorized DUe 556, with the sector analysis and scheduling logic 335 disposed within the CUe 553, such that the CUe analyzes and schedules each of the relevant sectors for each associated DUe (and potentially DUe of other gNBs) collectively. This approach has the advantage of, inter alia, giving the CUe analytics and scheduler process 335 a "high level" view of the ID, handovers/PCIs, spectrum allocation, interference, user load, etc. of each individual DUe 556 (the latter which may be disposed proximate one another with at least some overlap of one or more sectors, or at disparate locations having little if any sector overlap). Hence, the CUe in FIG. 5B can coordinate the activities (including scheduling) of two or more DUe such that for instance mutual interference between two sectors of adjacent (overlapping) DUe is minimized, thereby also reducing transmission power requirements.

It will also be appreciated that while described primarily with respect to a unitary gNB-CU entity or device as shown in FIGS. 5A-5B, the present disclosure is in no way limited to such architectures. For example, the techniques described herein may be implemented as part of a distributed or dis-aggregated or distributed CU entity (e.g., one wherein the user plane and control plane functions of the CU are dis-aggregated or distributed across two or more entities such as a CU-C (control) and CU-U (user)), and/or other functional divisions are employed.

It is also noted that heterogeneous architectures of eNBs or femtocells (i.e., E-UTRAN LTE/LTE-A Node B's or base stations) and gNBs may be utilized consistent with the architectures of FIGS. 5A and 5B. For instance, a given DUe may act (i) solely as a DUe (i.e., 5G NR PHY node) and operate outside of an E-UTRAN macrocell, or (ii) be physically co-located with an eNB or femtocell and provide NR coverage within a portion of the eNB macrocell coverage area, or (iii) be physically non-colocated with the eNB or femtocell, but still provide NR coverage within the macrocell coverage area.

Power Architecture—

Referring now to FIG. 6, one embodiment of an electrical power distribution architecture according to the disclosure is shown and described. It will be appreciated that while described in the context of electrical power distribution and management, the architecture and methodologies described herein may be readily adapted by those of ordinary skill to other types of physical plant services or infrastructure which may support operation of the base station apparatus 300.

As a brief aside, another aspect of small-cell deployment and use is electrical power provisioning. Often, such small-cell devices are limited in terms of electrical power that can be supplied thereto, whether due to limitations of a customer's premises wiring, other electrical demands on the power supply (such as e.g., a common power supply being used to supply multiple small-cells simultaneously). As such, various aspects of the service of a small-cell may be limited by electrical power availability, which may also vary as a function of e.g., time of day, load, etc.

Accordingly, the architecture 600 of FIG. 6 includes a power domain 653 having a local power supply entity 657 which is coupled electrically to an electrical grid or other source of power such as solar panels, storage battery, etc. Power inverter and rectifier components of the type normally sued with such sources (depending on type/configuration) are not shown for simplicity. The PSE 657 supplies power (e.g., single phase 115 VAC or 220 VAC, although other voltages and types may be used) to each of the CBSD/xNB apparatus 300, each serving respective RF coverage areas 655a-655c.

As described previously with respect to FIG. 5, each of the base stations 300 is backhauled to the MSO core via a DOCSIS modem 533 and supporting infrastructure (e.g., CMTS, CCAP RPD, etc.), for distribution of data originating from the base stations 300, and for delivery of data thereto from e.g., external sources. In the illustrated embodiment, the PSE 657 is also backhauled in the control plane (data) by a DOCSIS modem to the MSO core and ultimately the SAS 202, although it will be appreciated that other types of backhauls may be used, including wireless links, and whether operated by the MSO or otherwise. For instance, in one variant, the PSE 657 establishes data connectivity with the SAS via a an LTE or 5G NR modem and separate cellular service provider, or even a low bandwidth and long range LoRaWAN connection, or even a satellite-based link.

In operation, the PSE and SAS communicate data regarding power supply capacity, configuration, and availability, such that the SAS can maintain data useful to, inter alia, the base stations 300 for determining available power as described elsewhere herein. In the illustrated scenario of FIG. 6, a "cluster" (here three) CBSDs 300 are served power by the PSE, and as such the finite electrical power resources of the PSE can act as a limitation, especially where the number of devices 300 in the cluster grows. Data maintained by the SAS can be provided (e.g., via normal spectrum grant communication mechanisms or the like) to the base stations or their MSO network controllers 519 where used (see FIG. 5) based on e.g., a request/response or data push protocol. As such, the local analytics and schedule logic 335 of each base station 300 can selectively configure and activate various of its sectors based on, among other things, electrical power limitations which may be present.

It will also be recognized that as shown in FIG. 6, some of the RF coverage areas for the various small cells 300 may overlap with one another, and some may not. This is an artifact of the previously referenced often ad hoc placement of the small-cells by customers or installers; cell planning and similar activities traditionally associated with macro-cells are typically not utilized with small-cell placement, and hence a veritable patchwork of cell placements may occur, including in relation to macro-cell and other larger CBSDs (e.g., those used by the MSO for wireless backhaul for FWAs and similar). Hence, the SAS 202 in FIG. 6 may also maintain data relative to (i) geographic location of the small-cells 300 when installed (e.g., LAT/LON); (ii) type or power rating of each (e.g., Category A or B); (iii) geographic location of macro-cells or Category B CBSDs or other sources); (iv) frequency and power level data associated with the foregoing cells or other sources, where known; and (v) cell identifier data such as PCIs, as well as the aforementioned electrical power supply availability data. As such, each base station 300, through its data backhaul and connectivity to the SAS (or DP), can obtain useful data regarding surrounding cells, physical plant limitations, and the like by which the logic 335 can make selective sector assignments and establish sector configuration, including dynamically. Further, any network-level processes such as the controller 519 can coordinate selection/configuration of e.g., small-cells within a common cluster so as to optimize their service and mitigate inter-device interference.

Methods—

Figure 7:
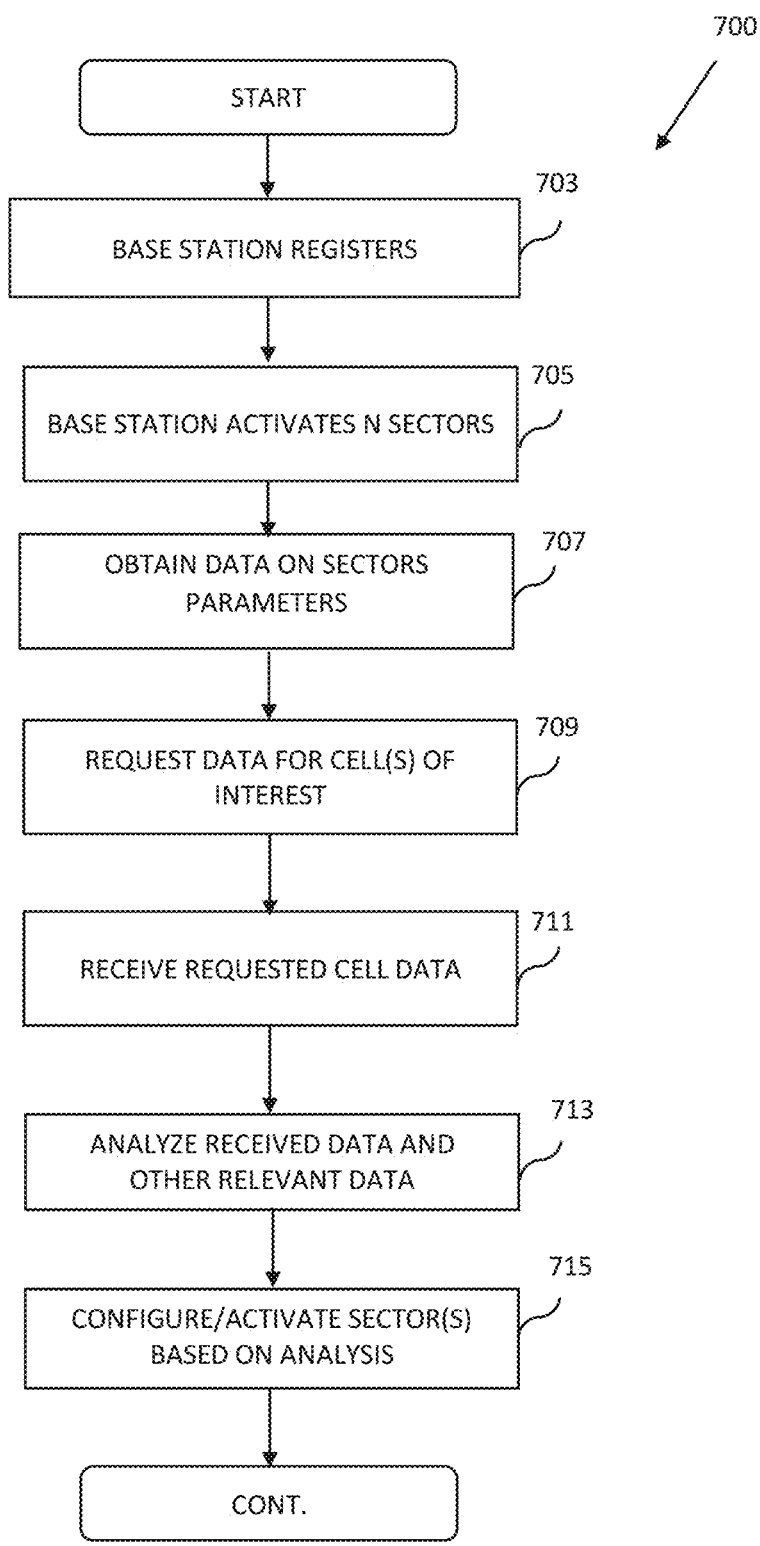
FIG. 7 is logical flow diagram of an exemplary embodiment of a generalized method for configuring antenna sectors according to the present disclosure.
Figure 8:
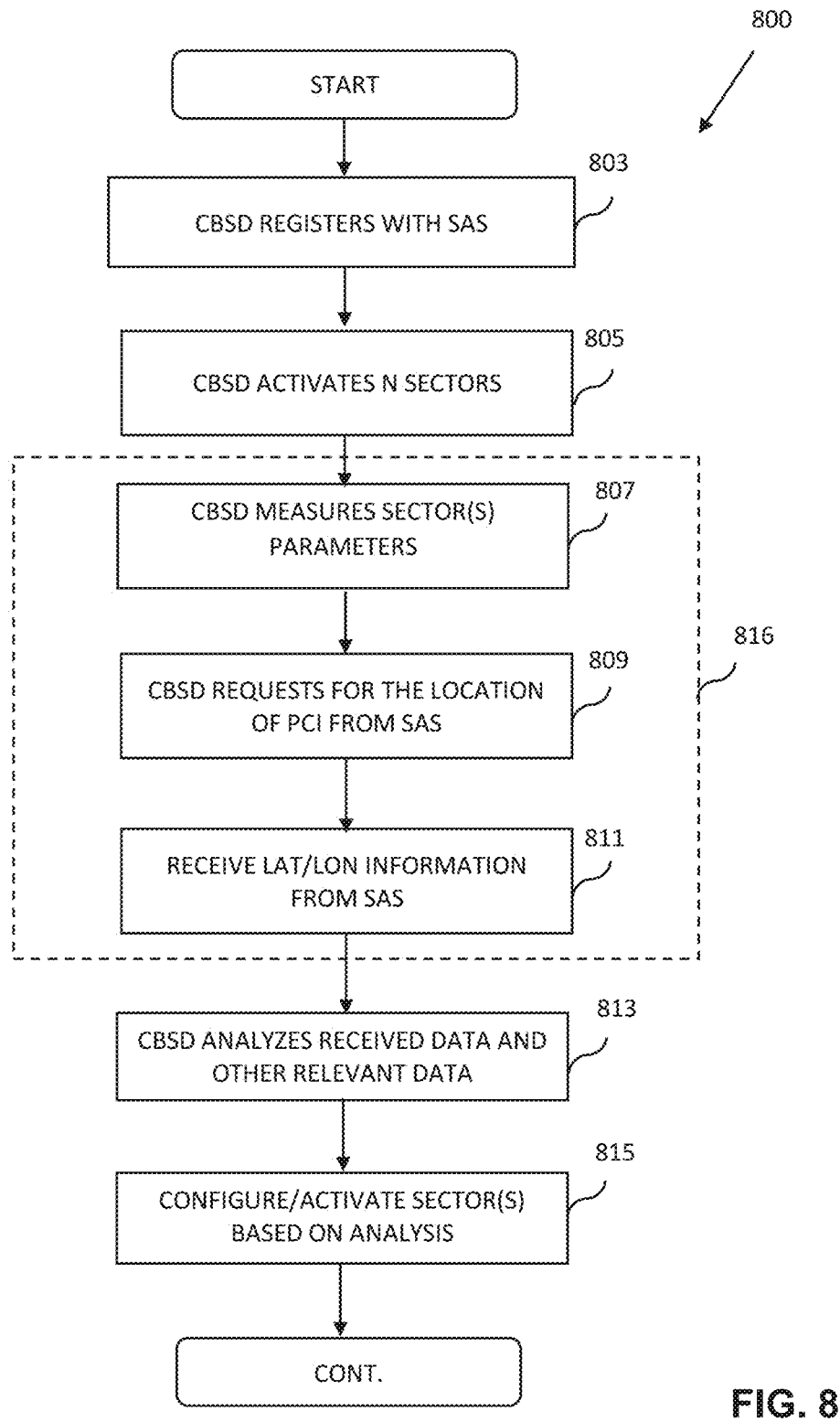
FIG. 8 is logical flow diagram of an exemplary implementation of the method of FIG. 7, in the context of a CBRS CBSD small cell, utilizing GAA and PAL spectrum.
Figure 9:
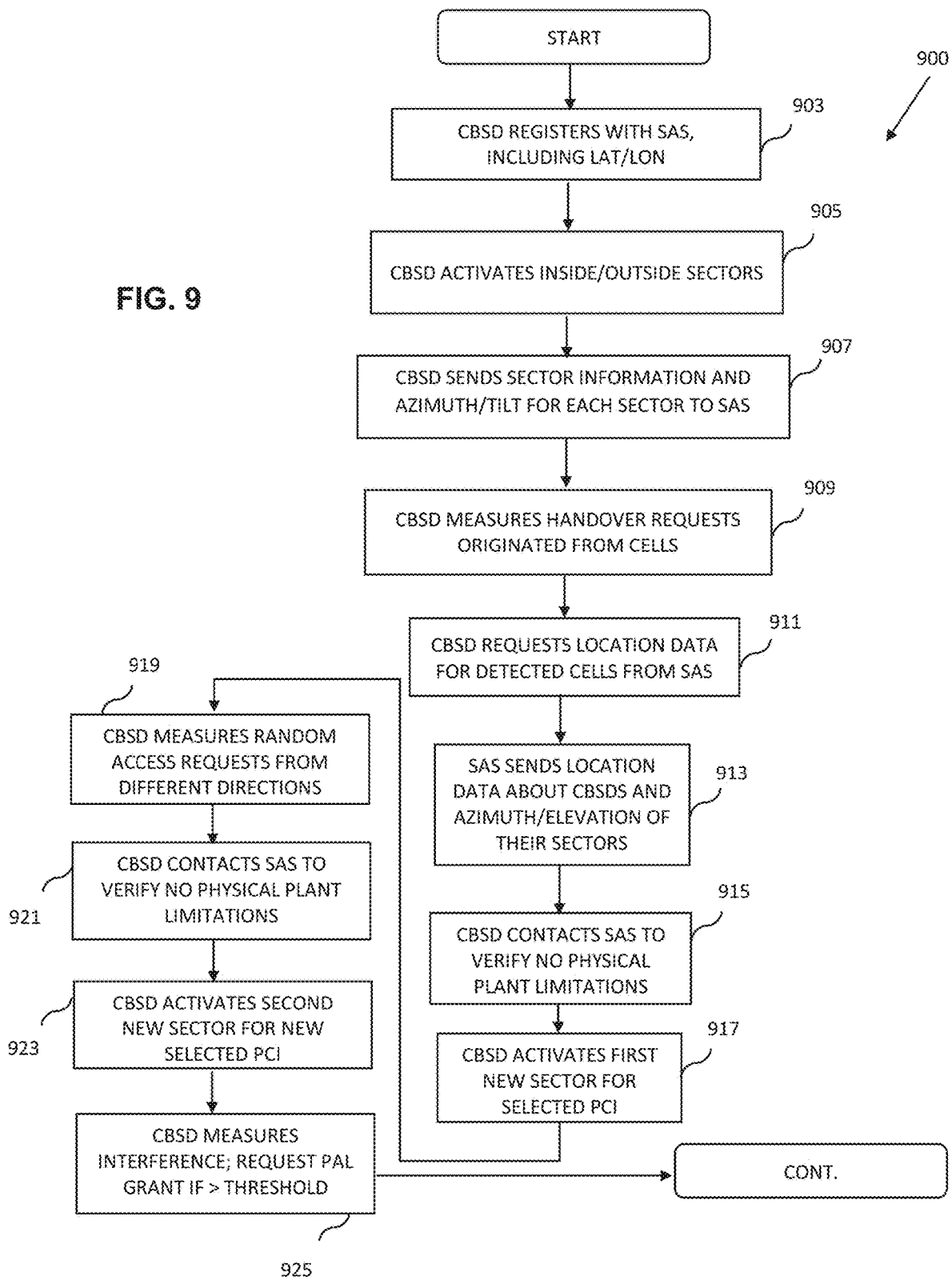
FIG. 9 is logical flow diagram of another exemplary embodiment of a method for configuring and operating antenna sectors according to the present disclosure.

Methods for utilizing wireless access point or base station apparatus according the present disclosure are now described with respect to FIGS. 7-9.

Referring now to FIG. 7, one embodiment of a generalized methodology 700 of multi-sector base station management and operation is shown and described.

At step 703 of the method 700, the base station (e.g., CBSD/xNB, FWA, or other small-cell) powers up, and registers to the cognizant network process or entity (e.g., DP or SAS for CBRS, depending on configuration) per step 705. As described below, in some embodiments, the BS 300 enumerates its individual available sectors and registers each individually with the SAS 202.

At step 705, the BS 300 turns on a preselected number (N) of antenna sectors, such as N sectors towards cell(s) with highest user traffic, or sectors having predefined desired coverage (e.g., one sector inside, one sector outside).

At step 707, the BS 300 obtains data on different cell sectors parameters such as user traffic associated with the different sectors, number of handover requests from different cells, number of random access requests from different cells, interference in each sector, availability of physical plant resources, and availability of RF spectrum in each sector. Such data may be obtained via direct measurement by the BS 300, from a measurement or data proxy, and/or yet other sources.

At step 709, the base station requests the location(s) of one or more cells (e.g., based on PCI) from the network entity. These one or more cells may be selected based on the prior obtained data for each of the sectors per step 707. For example, the BS 300 may determine that a given sector is a putative "hot spot" for user activity based on a large number of RACH attempts/requests.

At step 711, the network entity sends location (e.g., LAT/LON information) for each cell of interest to the BS 300.

At step 713, the BS 300 activates one or more new sectors towards the cells of interest, such as e.g., those with the highest traffic, highest RACH numbers, etc.

Referring now to FIG. 8, one implementation of the general methodology 700 of FIG. 7 is shown and described, in the exemplary context of a CBRS small-cell CB SD utilizing underlying 3GPP LTE or 5G NR protocols and technology within quasi-licensed CBRS spectrum (i.e., 3.55 to 3.70 GHz).

At step 803 of the method 800, the CB SD/xNB powers up, and registers to the cognizant network process or entity (e.g., DP or SAS) per step 805. As described below, in some embodiments, the CBSD 300 enumerates its individual available sectors and registers each individually with the SAS 202.

At step 805, the CBSD 300 turns on a preselected number (N) of antenna sectors, such as N sectors towards cell(s) with highest user traffic, or sectors having predefined desired coverage (e.g., one sector inside, one sector outside). These sectors may be determined by e.g., the analytics and schedule logic 335 of the device 300 at time of power-up, pre-programmed in device firmware, or even received via the backhaul from a network process such as the controller 519 if present.

At step 807, the CBSD 300 obtains data on different cell sectors parameters such as user traffic associated with the different sectors, number of handover requests from different cells based on PCI, number of random access requests (e.g., RACHs) from different cells, interference in each sector, availability of electrical power resources for supporting operation in each sector, and availability of spectrum in each sector.

At step 809, the CBSD requests the location(s) of one or more cells based on PCI, from the SAS/DP. These one or more cells may be selected based on the prior obtained data for each of the sectors per step 807.

At step 811, the network entity sends location (e.g., LAT/LON information) for each cell of interest to the CBSD 300.

At step 813, the CB SD 300 activates one or more new sectors towards the PCI(s) of interest, such as e.g., those with the highest traffic, highest RACH numbers, etc.

Figure 8A:
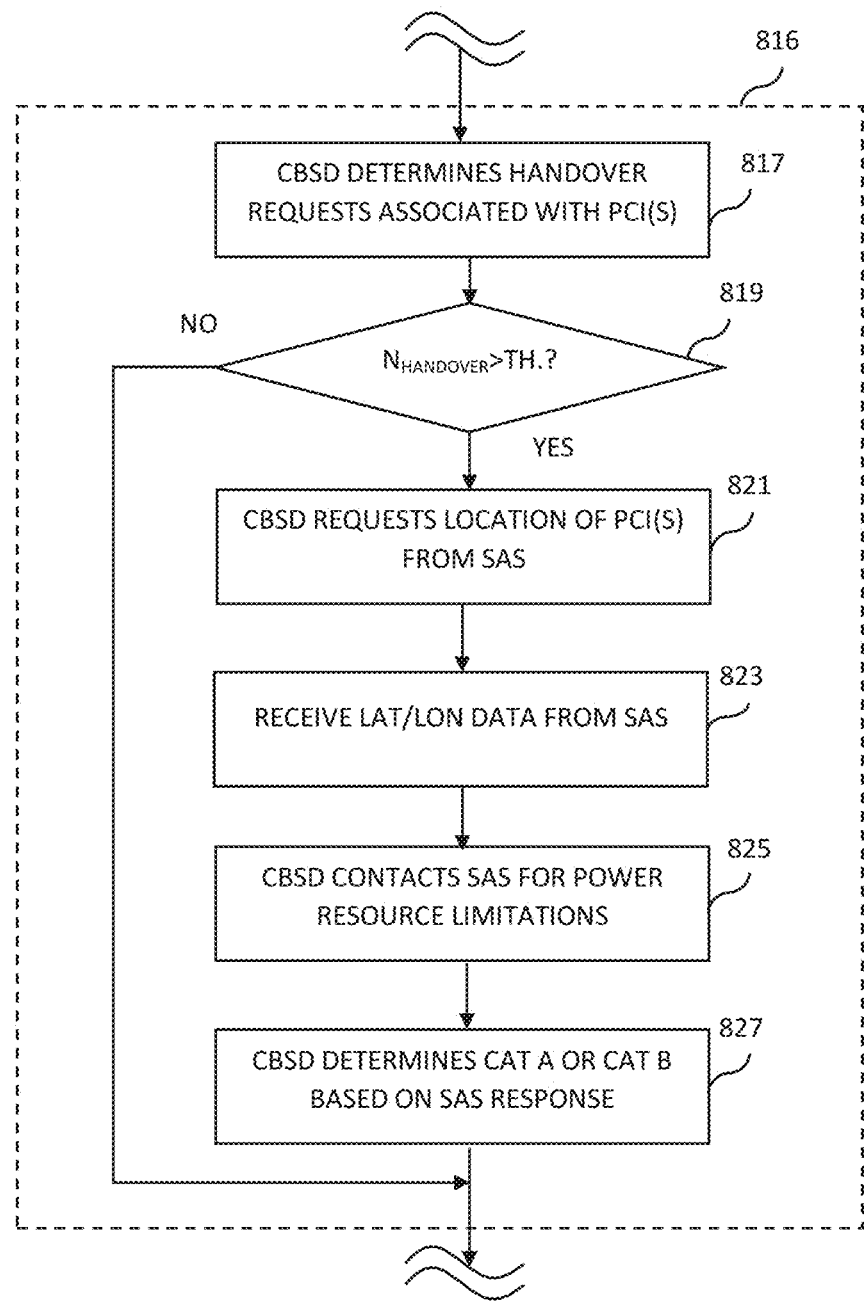
FIG. 8A is logical flow diagram of a first exemplary implementation of the method of FIG. 8A.

Referring now to FIG. 8A, a first particular implementation of the method 800 according to the present disclosure is described in detail, specifically with respect to step 816 of FIG. 8.

At step 817, the CB SD determines (e.g., measures) a number of handover requests from different PCIs in the network. In one embodiment, the number of handover requests are measured by 'handover' messages within the underlying (e.g., 3GPP) protocols triggered by the base station, and handover messages exchanged between the user equipment (UE) and base station. In some variants, the base station logic 335 can be configured to determine a handover density (e.g., number of handovers per a prescribed sector or azimuth per unit time) as a metric used in evaluating the handover aspects according to the method 800.

At step 819, the CBSD evaluates whether the number of handovers in a sector is higher than a prescribed threshold, and if higher proceeds to step 821 to facilitate creation of a new sector towards that PCI. It will be appreciated that other criteria may be used as well, whether alone or in conjunction with the foregoing, such as e.g., where a rate of new access requests exceeds a prescribed value within a prescribed time (irrespective of a total number received), or where a certain type of access request is determined to a exceed a threshold (e.g., only those occurring according to a prescribed protocol or within a certain prescribed temporal window).

At step 821, the CBSD requests the location of the target PCI(s) (i.e., those with number of handover requests that are higher than the threshold) from the SAS.

At step 823, the SAS sends the PCI location information to the CBSD 300.

At step 825, the CBSD checks with the SAS (or PSE 657) for the availability of electrical power resources or limitations. For instance, since there is limited amount of electrical power that can be allocated to a given CBSD cluster, the SAS/PSE determines the power status, and the SAS determines whether Category A or B operation can be allocated to the sector(s) per step 827.

Lastly, the CBSD creates new sectors, and shapes the antenna lobe accordingly (e.g., where beamforming or other techniques are used) towards those PCIs that e.g., meet the "trigger" criteria such as a higher number of handover requests than the threshold.

Figure 8B:
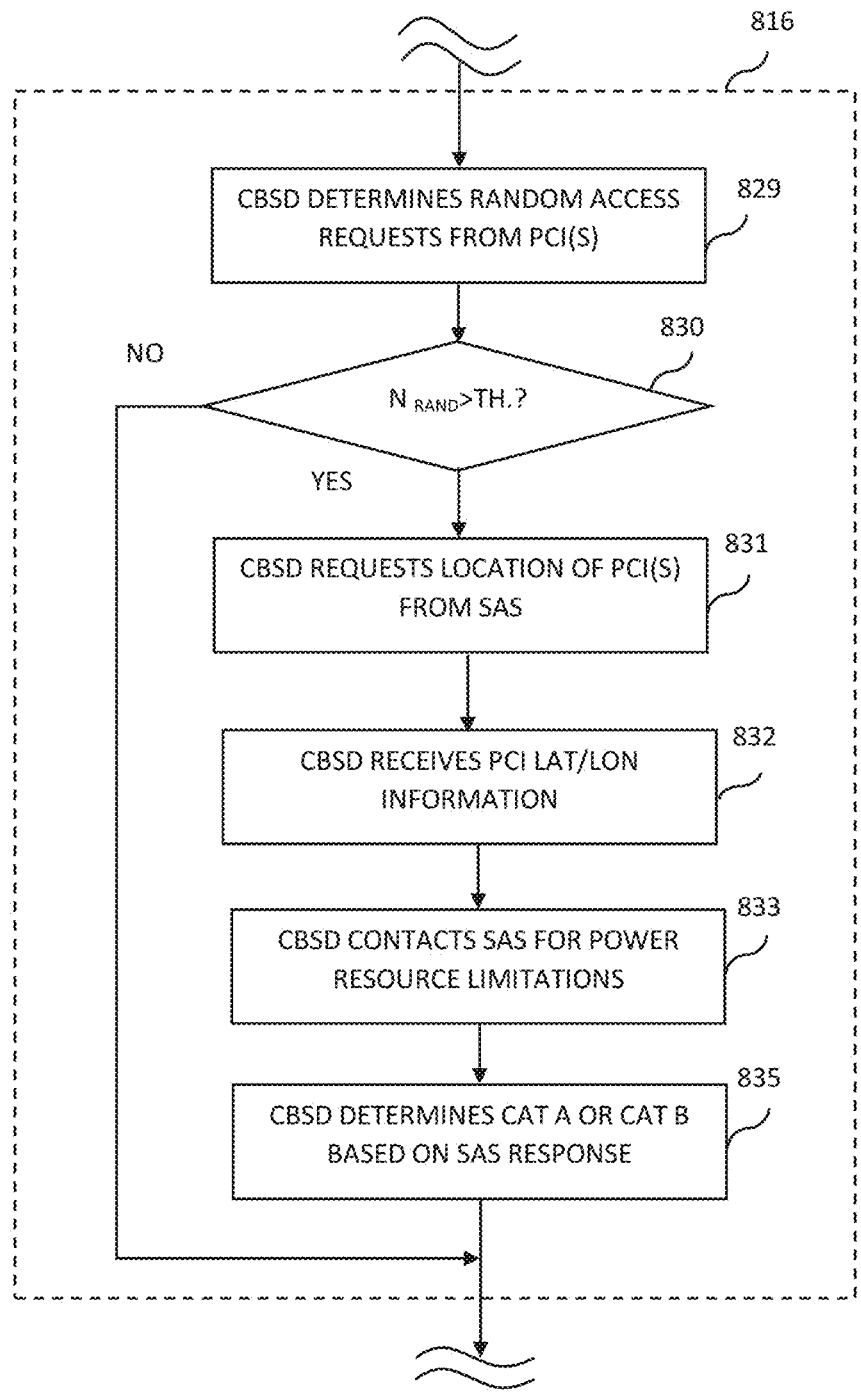
FIG. 8B is logical flow diagram of a second exemplary implementation of the method of FIG. 8A, based on random access requests.

Referring to FIG. 8B, a second implementation of the method 800 (step 816) is now shown and described in detail.

At step 829, the CBSD measures or determines a number of random access requests from different PCIs in the network. For instance, in one variant, the CBSD receives data from UE making a RACH request indicating a last PCI which that UE identified or communicated with. As such, when the CB SD obtains a suitable amount of such data, it can generate e.g., a histogram or similar data correlating RACH attempts to specific PCIs.

At step 830, the CBSD checks whether the number of random access request in a given sector or sectors is higher than a threshold, and if higher proceeds to step 831 towards the ultimate creation a new sector towards the PCI(s) of interest (i.e., those with access requests exceeding the threshold).

At step 831, the CB SD requests location data for PCIs having random access requests that are higher than the threshold, from the SAS.

At step 832, the SAS sends the PCI location data to the CBSD.

At step 833, the CBSD checks with the SAS or PSE for the availability of power resources.

Figure 8C:
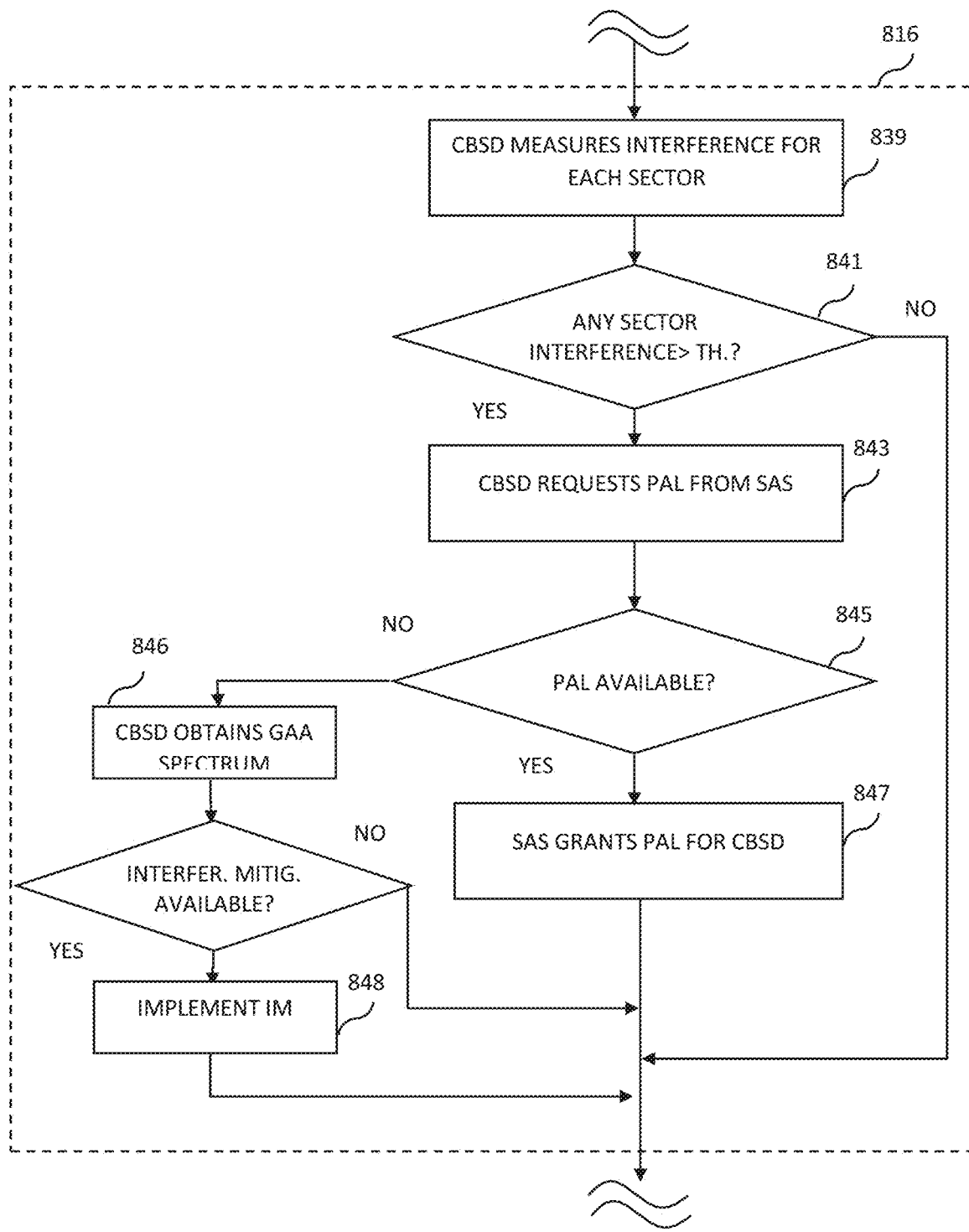
FIG. 8C is logical flow diagram of a third exemplary implementation of the method of FIG. 8A, based on the interference level in a sector.

Referring now to FIG. 8C, a third implementation of the method 800 (step 816) is shown and described in detail.

At step 839, the CB SD measures or otherwise determines (such as via a measurement proxy device) interference for each sector of its antenna array.

At step 841, the CBSD logic 335 determines if the determined interference in any sector is higher than a prescribed threshold or meets one or more other criteria such as instability. If the interference in a sector is higher than the threshold or meets the relevant criteria, the method proceeds to step 843, wherein the CBSD requests PAL spectrum from the SAS 202. If the PAL spectrum is available per step 845, the SAS grants the PAL for use by the CBSD (e.g., for one or more specific sectors thereof) per step 847.

In one implementation, the SAS grants particular PAL spectrum for the CBSD/sector(s) having the highest distance in the frequency domain from the adjacent sectors. For example, in one approach, the SAS includes algorithms which determine registered adjacent sectors (if any) and calculates a putative carrier or carriers for use by the target sector(s) based on a maximization of those carriers from carriers being utilized by the adjacent sectors; i.e., where all frequency "proximity" values are maximized, so as to mitigate potential interference. In another approach, the SAS may look at recently relinquished or withdrawn PAL spectrum within certain pre-designated bands as a pool of possible candidates.

It will also be appreciated that PAL assignments may be based on other considerations (e.g., in combination with the foregoing selection routines), such as e.g., spatial considerations or plans. For example, in one embodiment, the SAS may assign PAL spectrum to outdoor sectors, and GAA spectrum to indoor sectors such as shown in FIG. 4E (or vice versa). Similarly, PAL may be assigned only for use with certain backhauls modalities (FIG. 4D), whether as the backhaul or as the user/CBSD spectrum that is being backhauled by another means.

Returning to FIG. 8C, at step 846, if PAL spectrum is not available for the requesting CBSD/sector(s), the CBSD obtains GAA spectrum for the relevant sector(s), and subsequently determines if further interference mitigation is available/appropriate. Since (unlicensed) GAA is typically much "dirtier" spectrum than ("licensed") PAL, many user or other devices may be operating therein. As such, active or passive interference mitigation per step 848 may be used when operating in GAA, such as active interferer avoidance algorithms (e.g., dynamically switching bands to those least impacted), increase of transmit power, change of modulation/coding scheme or MCS, use of (greater) spatial diversity, etc.

Figure 8D:
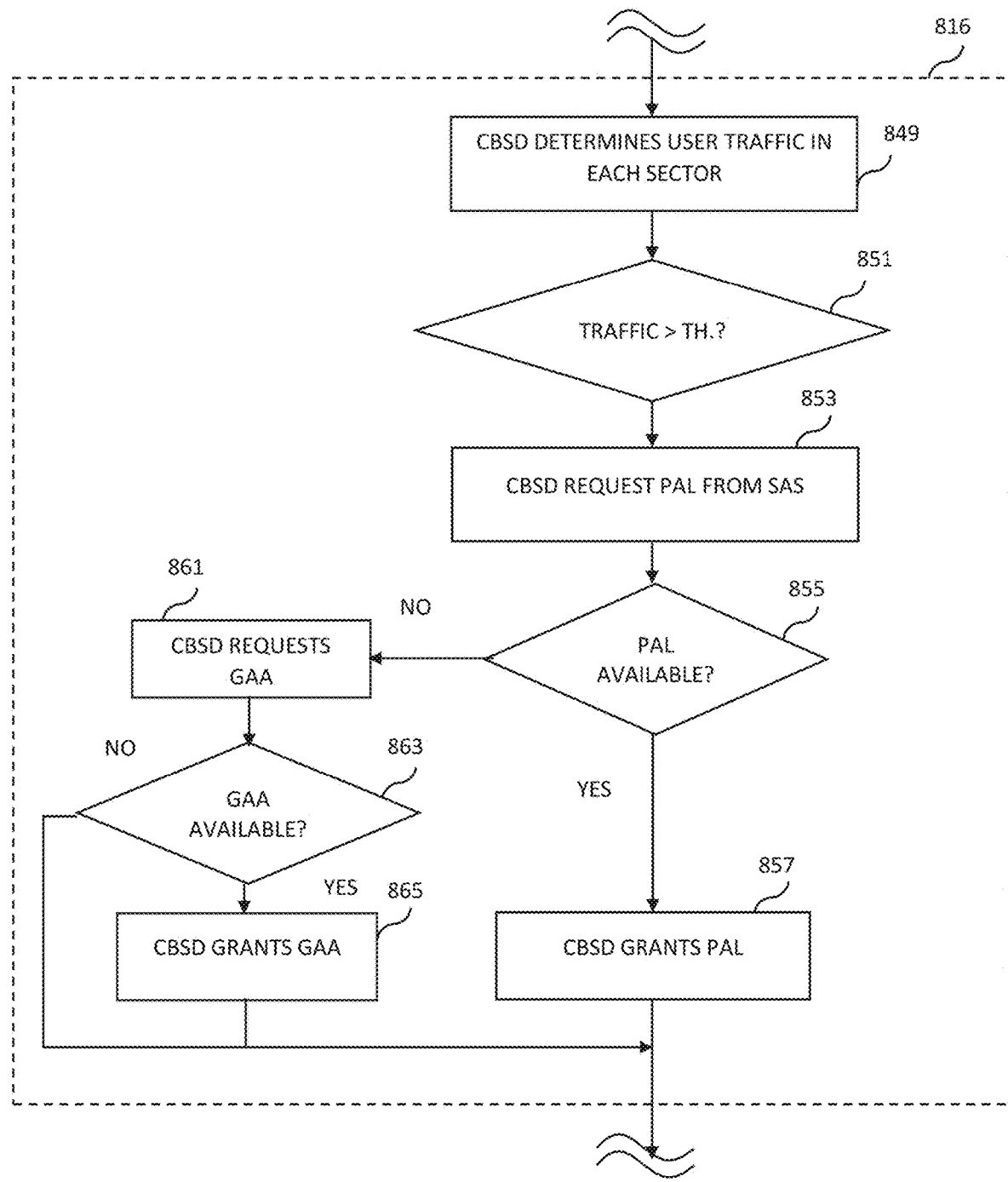
FIG. 8D is logical flow diagram of a fourth exemplary implementation of the method of FIG. 8A, based on user traffic in a sector.

Referring now to FIG. 8D, yet another implementation of the method of FIG. 8 (step 816) is described in detail.

At step 849, the CB SD measures user traffic for each of its sectors (or a prescribed subset thereof). In one embodiment, traffic load in a sector is determined using any combination of data relating to: (i) DL physical resource block (RB) usage; (ii) the number of connected users in a sector (based on e.g., individual UE identifiers); (iii) UL physical RB usage; and/or (iv) the number of scheduler users, although other metrics may be used consistent with the disclosure.

At step 851, the CBSD logic 335 determines if the interference in a sector (or any sector in some embodiment) is higher than a threshold value. If the interference in the sector(s) of interest is higher than the threshold, the method proceeds to step 853, wherein the CB SD requests PAL spectrum from the SAS 202. If the PAL spectrum is available per step 855, the SAS grants the PAL for use by the CBSD (e.g., for one or more specific sectors thereof) per step 857.

At steps 856, 863, and 865, if PAL spectrum is not available for the requesting CBSD/sector(s), the CB SD obtains GAA spectrum for the relevant sector(s). Interference mitigation (as previously described) may also be used if desired to optimize the GAA spectrum operation.

FIG. 9 is logical flow diagram of another exemplary embodiment of a method for configuring and operating antenna sectors according to the present disclosure. As shown, the method 900 includes first having the CBSD 300 register with the SAS, including provision of its location (e.g., LAT/LON), such via data obtained from an indigenous GPS receiver (see FIG. 3), or from an external or other positioning system (e.g., based on association with one more access nodes or network nodes, based on user entry of data, or other).

Next, per step 905, the CB SD activates certain sectors; e.g., one or more inside sectors, and one or more outside sectors in the exemplary "inside-outside" models of FIGS. 4E-4G. The prescribed activation sectors may be varied, include all sectors, or just a subset of all sectors, depending on configuration.

Per step 907, the CBSD obtains and sends data for each of the activated sectors to the SAS. The data may also include absolute or relative azimuth data, as well as elevation/tilt data where applicable. This type of data gives the SAS an idea of the lobe geometry of the sector for purposes of, e.g., interference modeling or calculation in some embodiments.

Per step 909, the CB SD measures or enumerates handover requests originated from various of its sectors. In one approach, PCI values associated with each cell which are encompassed by a given sector are reported to the CBSD, such as from a UE or other device making the handover request. As such, the CB SD can gather statistics for e.g., a given period of time on handover requests between a number of different cells within its coverage sectors.

Per step 911, the CBSD requests location data (e.g., LAT/LON) from the SAS on one or more cells based on the PCIs obtained while aggregating the handover request data.

In step 913, responsive to the CBSD request of step 911, the SAS sends the location data, and may also send data on the individual devices such as e.g., other CBSDs, individual sectors thereof, etc., including for e.g., the azimuth/tilt data previously referenced (yet for the other device(s)).

Once the CBSD processes the received data (whether alone or in conjunction with e.g., a network controller 519 as shown in FIG. 5), it generates a sector activation "plan" or selection, and based thereon, contacts the SAS (or PSE directly) for determination of available physical plant services (e.g., power) or limitations thereon as previously discussed, per step 915.

Per step 917, the CBSD activates—subject to any limitations of step 915—a first new sector in its generated selection or plan. In one embodiment, this corresponds to one or more selected PCIs from step 911.

Per step 919, the CBSD then (or at a later time) measures random access (e.g., 3GPP RACH) requests from UEs associated with the different sectors of the device 300. These may be e.g., on a per-sector basis, such that the CBSD can characterize its "RACH" environment as a function of azimuth.

Based thereon, the CB SD then generates an updated selection/plan, contacts the SAS or PSE to update any physical plant limitations (step 921), and then activates a second (new) sector for the one or more selected PCIs associated with the target sector(s).

Per step 923, the CBSD activates a second (new) sector for one or more target PCIs Lastly, per step 925, the CBSD measures (or otherwise obtains data, such as from another device or via a backhaul connection) interference for the activated sector(s). If the interference level is above a prescribed threshold or exhibits other characteristics (e.g., high instability), then the CBSD may request to be granted noise-optimized spectrum such as e.g., CBSD PAL, so as to mitigate the interference and/or reduce its requisite transmission power to achieve a desired SINR at one or more target devices within the target sector(s).

It will be appreciated that various steps of the methods of FIGS. 8-9 discussed above (including portions thereof) may be performed collectively, such as or in parallel with one another. Moreover, those of ordinary skill given this disclosure will readily appreciate that the logic of the various methods may be combined and/or permuted in order, so as to e.g., achieve a particular design or operational objective or scenario. For instance, in some applications, only a subset of the foregoing parameters (e.g., traffic, handover frequency, RACH accesses, etc.) may be considered as part of the sector configuration and schedule/operation logic. In other applications, the use or lack of use of any such parameters may be predicated on outcomes of processes associated with one or more other parameters.

FIG. 10 is a ladder diagram illustrating the communication flow between CBSD, SAS, and Power plant. As illustrated, at power-up, the base station (e.g., CBSD) 300 first registers with the network (e.g., SAS 202) per step 1002, and then enumerates its sectors and determines which sectors are available, and sends this data to the SAS 202 per step 1004. Based thereon, the CB SD and sectors are registered with the SAS and registration confirmed per step 1006. Sector IDs may be requested for each of the identified sectors from the SAS 202, and the IDs (if) received by the base station are stored e.g., locally in mass storage.

Next, the CBSD sends a request to the SAS 202 for one or more sector categories (e.g., Category A or B CBSD) per step 1008. For instance, the CB SD may want to activate a sector as a Category A CBSD, and requires at least permission from the SAS to operate at the prescribed power level.

Per step 1010, in one embodiment the SAS requests data on available power necessary to support the requested category from the PSE 657. It will be appreciated that while the SAS is shown communicating with the PSE in the illustrated embodiment, other approaches may be used, such as where the requesting CBSD has direct or indirect access to the PSE (aside from the SAS), and does not require the SAS to act as its "power proxy." Alternatively, the PSE may periodically push power availability data to the SAS and/or CBSD. Yet other approaches will be recognized by those of ordinary skill given the present disclosure.

Per step 1012, the PSE responds to the SAS with either a YES (1012) in which case per step 1014 the CB SD is informed to turn on the requested sector as the selected Category (Cat. A in this example). Alternatively, if no power is available (or insufficient power is available, such as where the CB SD requests Cat. B operation and the PSE does not indicate sufficient power available), then per steps 106 and 1018, the CBSD is informed that the sector cannot be energized as requested, and a backoff timer or similar mechanism is used for a subsequent re-attempt, or other logic is implemented (such as for example fallback to a lower or default request/power level).

It will be appreciated that while substitution of GAA for PAL spectrum when the latter is not available is but one possible logical construct that may be used by the controller logic 476 of the access point 470. For instance, in another variant, the logic may simply utilize a try-and-wait scheme for obtaining PAL, in effect recursively attempting to obtain a PAL spectrum grant via the DP or SAS until successful. It will be recognized that while certain aspects of the disclosure are described in terms of a specific sequence of steps of a method, these descriptions are only illustrative of the broader methods of the disclosure, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the disclosure disclosed and claimed herein.

While the above detailed description has shown, described, and pointed out novel features of the disclosure as applied to various embodiments, it will be understood that various omissions, substitutions, and changes in the form and details of the device or process illustrated may be made by those skilled in the art without departing from the disclosure. This description is in no way meant to be limiting, but rather should be taken as illustrative of the general principles of the disclosure. The scope of the disclosure should be determined with reference to the claims.

It will be further appreciated that while certain steps and aspects of the various methods and apparatus described herein may be performed by a human being, the disclosed aspects and individual methods and apparatus are generally computerized/computer-implemented. Computerized apparatus and methods are necessary to fully implement these aspects for any number of reasons including, without limitation, commercial viability, practicality, and even feasibility (i.e., certain steps/processes simply cannot be performed by a human being in any viable fashion).

Appendix I—LTE Frequency Bands—TS 36.101
(Rel. 14 Jun. 2017)

| Band | Name | Downlink (MHz) Low | Middle EARFCN[1] | High | Bandwidth DL/UL (MHz) | Uplink (MHZ) Low | Middle EARFCN | High | Duplex spacing (MHz) | Equivalent UMTS band |
|---|---|---|---|---|---|---|---|---|---|---|
| 1 | 2100 | 2110 | 2140 | 2170 | 60 | 1920 | 1950 | 1980 | 190 | 1 |
|   |      | 0    | 300  | 599  |    | 18000| 18300| 18599|     |   |
| 2 | 1900 PCS | 1930 | 1960 | 1990 | 60 | 1850 | 1880 | 1910 | 80 | 2 |
|   |      | 600  | 900  | 1199 |    | 18600| 18900| 19199|    |   |
| 3 | 1800+ | 1805 | 1842.5 | 1880 | 75 | 1710 | 1747.5 | 1785 | 95 | 3 |
|   |      | 1200 | 1575 | 1949 |    | 19200| 19575| 19949|    |   |
| 4 | AWS-1 | 2110 | 2132.5 | 2155 | 45 | 1710 | 1732.5 | 1755 | 400 | 4 |
|   |      | 1950 | 2175 | 2399 |    | 19950| 20175| 20399|    |   |
| 5 | 850 | 869 | 881.5 | 894 | 25 | 824 | 836.5 | 849 | 45 | 5 |
|   |      | 2400 | 2525 | 2649 |    | 20400| 20525| 20649|    |   |
| 6 | UMTS only | 875 | 880 | 885 | 10 | 830 | 835 | 840 | 45 | 6 |
|   |      | 2650 | 2700 | 2749 |    | 20650| 20700| 20749|    |   |
| 7 | 2600 | 2620 | 2655 | 2690 | 70 | 2500 | 2535 | 2570 | 120 | 7 |
|   |      | 2750 | 3100 | 3449 |    | 20750| 21100| 21449|    |   |
| 8 | 900 GSM | 925 | 942.5 | 960 | 35 | 880 | 897.5 | 915 | 45 | 8 |
|   |      | 3450 | 3625 | 3799 |    | 21450| 21625| 21799|    |   |
| 9 | 1800 | 1844.9 | 1862.4 | 1879.9 | 35 | 1749.9 | 1767.4 | 1784.9 | 95 | 9 |
|   |      | 3800 | 3975 | 4149 |    | 21800| 21975| 22149|    |   |
| 10 | AWS-1+ | 2110 | 2140 | 2170 | 60 | 1710 | 1740 | 1770 | 400 | 10 |
|   |      | 4150 | 4450 | 4749 |    | 22150| 22450| 22749|    |   |
| 11 | 1500 Lower | 1475.9 | 1485.9 | 1495.9 | 20 | 1427.9 | 1437.9 | 1447.9 | 48 | 11 |
|   |      | 4750 | 4850 | 4949 |    | 22750| 22850| 22949|    |   |
| 12 | 700 a | 729 | 737.5 | 746 | 17 | 699 | 707.5 | 716 | 30 | 12 |
|   |      | 5010 | 5095 | 5179 |    | 23010| 23095| 23179|    |   |
| 13 | 700 c | 746 | 751 | 756 | 10 | 777 | 782 | 787 | −31 | 13 |
|   |      | 5180 | 5230 | 5279 |    | 23180| 23230| 23279|     |   |
| 14 | 700 PS | 758 | 763 | 768 | 10 | 788 | 793 | 798 | −30 | 14 |
|   |      | 5280 | 5330 | 5379 |    | 23280| 23330| 23379|     |   |
| 17 | 700 b | 734 | 740 | 746 | 12 | 704 | 710 | 716 | 30 |   |
|   |      | 5730 | 5790 | 5849 |    | 23730| 23790| 23849|    |   |
| 18 | 800 Lower | 860 | 867.5 | 875 | 15 | 815 | 822.5 | 830 | 45 |   |
|   |      | 5850 | 5925 | 5999 |    | 23850| 23925| 23999|    |   |
| 19 | 800 Upper | 875 | 882.5 | 890 | 15 | 830 | 837.5 | 845 | 45 | 19 |
|   |      | 6000 | 6075 | 6149 |    | 24000| 24075| 24149|    |   |
| 20 | 800 DD | 791 | 806 | 821 | 30 | 832 | 847 | 862 | −41 | 20 |
|   |      | 6150 | 6300 | 6449 |    | 24150| 24300| 24449|     |   |
| 21 | 1500 Upper | 1495.9 | 1503.4 | 1510.9 | 15 | 1447.9 | 1455.4 | 1462.9 | 48 | 21 |
|   |      | 6450 | 6525 | 6599 |    | 24450| 24525| 24599|    |   |
| 22 | 3500 | 3510 | 3550 | 3590 | 80 | 3410 | 3450 | 3490 | 100 | 22 |
|   |      | 6600 | 7000 | 7399 |    | 24600| 25000| 25399|     |   |
| 23 | 2000 S-band | 2180 | 2190 | 2200 | 20 | 2000 | 2010 | 2020 | 180 |   |
|   |      | 7500 | 7600 | 7699 |    | 25500| 25600| 25699|     |   |
| 24 | 1600 L-band | 1525 | 1542 | 1559 | 34 | 1626.5 | 1643.5 | 1660.5 | −101.5 |   |
|   |      | 7700 | 7870 | 8039 |    | 25700| 25870| 26039|        |   |
| 25 | 1900+ | 1930 | 1962.5 | 1995 | 65 | 1850 | 1882.5 | 1915 | 80 | 25 |
|   |      | 8040 | 8365 | 8689 |    | 26040| 26365| 26689|    |   |
| 26 | 850+ | 859 | 876.5 | 894 | 35 | 814 | 831.5 | 849 | 45 | 26 |
|   |      | 8690 | 8865 | 9039 |    | 26690| 26865| 27039|    |   |

-continued

| Band | Name | Downlink (MHz) Low | Middle EARFCN[1] | High | Bandwidth DL/UL (MHz) | Uplink (MHZ) Low | Middle EARFCN | High | Duplex spacing (MHz) | Equivalent UMTS band |
|---|---|---|---|---|---|---|---|---|---|---|
| 27 | 800 SMR | 852 9040 | 860.5 9125 | 869 9209 | 17 | 807 27040 | 815.5 27125 | 824 27209 | 45 | |
| 28 | 700 APT | 758 9210 | 780.5 9435 | 803 9659 | 45 | 703 27210 | 725.5 27435 | 748 27659 | 55 | |
| 29 | 700 d | 717 9660 | 722.5 9715 | 728 9769 | 11 | Downlink only | | | | |
| 30 | 2300 WCS | 2350 9770 | 2355 9820 | 2360 9869 | 10 | 2305 27660 | 2310 27710 | 2315 27759 | 45 | |
| 31 | 450 | 462.5 9870 | 465 9895 | 467.5 9919 | 5 | 452.5 27760 | 455 27785 | 457.5 27809 | 10 | |
| 32 | 1500 L-band | 1452 9920 | 1474 10140 | 1496 10359 | 44 | Downlink only | | | | 32 |
| 65 | 2100+ | 2110 65536 | 2155 65986 | 2200 66435 | 90 | 1920 131072 | 1965 131522 | 2010 131971 | 190 | |
| 66 | AWS-3 | 2110 66436 | 2155 66886 | 2200 67335 | 90/70 | 1710 131972 | 1745 132322 | 1780 132671 | 400 | |
| 67 | 700 EU | 738 67336 | 748 67436 | 758 67535 | 20 | Downlink only | | | | |
| 68 | 700 ME | 753 67536 | 768 67686 | 783 67835 | 30 | 698 132672 | 713 132822 | 728 132971 | 55 | |
| 69 | 2500 | 2570 67836 | 2595 68086 | 2620 68335 | 50 | Downlink only | | | | |
| 70 | AWS-4 | 1995 68336 | 2007.5 68461 | 2020 68585 | 25/15 | 1695 132972 | 1702.5 133047 | 1710 133121 | 300 | |
| 252 | Unlicensed NII-1 | 5150 255144 | 5200 255644 | 5250 256143 | 100 | Downlink only | | | | |
| 255 | Unlicensed NII-3 | 5725 260894 | 5787.5 261519 | 5850 262143 | 125 | Downlink only | | | | |
| TDD | | | | | | | | | | |
| 33 | TD 1900 | 1900 36000 | 1910 36100 | 1920 36199 | 20 | | | | | A(lo) |
| 34 | TD 2000 | 2010 36200 | 2017.5 36275 | 2025 36349 | 15 | | | | | A(hi) |
| 35 | TD PCS Lower | 1850 36350 | 1880 36650 | 1910 36949 | 60 | | | | | B(lo) |
| 36 | TD PCS Upper | 1930 36950 | 1960 37250 | 1990 37549 | 60 | | | | | B(hi) |
| 37 | TD PCS Center gap | 1910 37550 | 1920 37650 | 1930 37749 | 20 | | | | | C |
| 38 | TD 2600 | 2570 37750 | 2595 38000 | 2620 38249 | 50 | | | | | D |
| 39 | TD 1900+ | 1880 38250 | 1900 38450 | 1920 38649 | 40 | | | | | F |
| 40 | TD 2300 | 2300 38650 | 2350 39150 | 2400 39649 | 100 | | | | | E |
| 41 | TD 2500 | 2496 39650 | 2593 40620 | 2690 41589 | 194 | | | | | |
| 42 | TD 3500 | 3400 41590 | 3500 42590 | 3600 43589 | 200 | | | | | |
| 43 | TD 3700 | 3600 43590 | 3700 44590 | 3800 45589 | 200 | | | | | |
| 44 | TD 700 | 703 45590 | 753 46090 | 803 46589 | 100 | | | | | |
| 45 | TD 1500 | 1447 46590 | 1457 46690 | 1467 46789 | 20 | | | | | |
| 46 | TD Unlicensed | 5150 46790 | 5537.5 50665 | 5925 54539 | 775 | | | | | |
| 47 | TD V2X | 5855 54540 | 5890 54890 | 5925 55239 | 70 | | | | | |
| 48 | TD 3600 | 3550 55240 | 3625 55990 | 3700 56739 | 150 | | | | | |

[1]EUTRA Absolute RF Channel Number

What is claimed is:

1. Computerized network apparatus, comprising:
   digital processor apparatus;
   at least one interface apparatus in data communication with the digital processor apparatus and configured for data communication with at least one multi-sector base station apparatus; and
   a computer readable apparatus in data communication with the digital processor apparatus and comprising a storage medium, the storage medium comprising at least one computer program having a plurality of instructions which are configured to, when executed on the digital processor apparatus, cause the computerized network apparatus to:
   receive, from the at least one multi-sector base station apparatus, data representative of at least one request for at least one location of at least one of a plurality of different wireless cells; and based on the receipt of the data representative of the at least one request, transmit, to the at least one multi-sector base station apparatus, (i) data relating to the at least one location, and (ii) data relating to at least one electrical power supply capability for electrical power service;

wherein the data relating to the at least one location and the data relating to the at least one electrical power supply capability for the electrical power service enables the at least one multi-sector base station apparatus to selectively activate one or more sectors.

2. The computerized network apparatus of claim 1, wherein the selective activation of the one or more sectors is based on at least one of (i) number of random access requests in the one or more sectors, (ii) a number of handover requests in the one or more sectors, or (iii) an interference level in each of the one or more sectors.

3. The computerized network apparatus of claim 1, wherein the plurality of instructions are further configured to, when executed on the digital processor apparatus, cause the computerized network apparatus to:

register at least the one or more sectors and the at least one multi-sector base station apparatus.

4. Computerized network apparatus, comprising:

digital processor apparatus;

at least one interface apparatus in data communication with the digital processor apparatus and configured for data communication with at least one multi-sector base station apparatus; and a computer readable apparatus in data communication with the digital processor apparatus and comprising a storage medium, the storage medium comprising at least one computer program having a plurality of instructions which are configured to, when executed on the digital processor apparatus, cause the computerized network apparatus to:

receive, from the at least one multi-sector base station apparatus, data representative of at least one request for at least one location of at least one of a plurality of different wireless cells;

receive data representative of a request for at least one respective category of at least one respective sector;

obtain data on available power necessary to support the at least one respective category; and based on the receipt of the data representative of the at least one request, transmit data relating to the at least one location to the at least one multi-sector base station apparatus, the data relating to the at least one location enabling the at least one multi-sector base station apparatus to selectively activate one or more sectors as one or more of the at least one respective category, respectively.

5. The computerized network apparatus of claim 4, wherein the at least one category comprises at least one of a Citizens Broadband Radio Service (CBRS) Category A Citizens Broadband Service Radio Device (CBSD), or a CBRS Category B CBSD.

6. The computerized network apparatus of claim 4, wherein the computerized network apparatus comprises at least one of a Citizens Broadband Radio Service (CBRS) domain proxy (DP) or spectrum allocation system (SAS).

7. A computer readable apparatus comprising at least one non-transitory storage medium, the at least one non-transitory storage medium comprising at least one computer program configured to, when executed on a processing apparatus of a computerized network apparatus, cause the computerized network apparatus to:

receive, from at least one base station apparatus, data representative of at least one request for location data associated with at least one of a plurality of different wireless cells;

determine an availability of electrical power resources; and based on the receipt of the data representative of the at least one request, transmit the location data to the at least one base station apparatus, the location data enabling the at least one base station apparatus to selectively activate one or more sectors based at least on the availability of the electrical power resources.

8. The computer readable apparatus of claim 7, wherein the determination of the availability of the electrical power resources comprises a determination of whether Category A or B operation can be allocated to the one or more sectors, the determination based on an amount of electrical power that can be allocated to a base station cluster including the at least one base station apparatus.

9. The computer readable apparatus of claim 7, wherein the receipt of the data representative of the at least one request for the location data is based on a determination that a number of random access requests from a plurality of physical cell identities (PCIs) associated with the plurality of different wireless cells, respectively, is higher than a prescribed threshold.

10. The computer readable apparatus of claim 7, wherein the activated one or more sectors comprises at least one activated sector encompassing at least one location indicated by the location data within an azimuth of coverage of the activated one or more sectors.

11. A computer readable apparatus comprising at least one non-transitory storage medium, the at least one non-transitory storage medium comprising at least one computer program configured to, when executed on a processing apparatus of a computerized network apparatus, cause the computerized network apparatus to:

receive, from at least one base station apparatus, data representative of at least one request for location data associated with at least one of a plurality of different wireless cells;

based on the receipt of the data representative of the at least one request, transmit the location data to the at least one base station apparatus, the location data enabling the at least one base station apparatus to selectively activate one or more sectors; and based on data relating to an interference level associated with the one or more sectors, generate a spectrum grant of at least one of (i) a first type of generally accessible spectrum, or (ii) a second type of restricted access spectrum, for the at least one base station apparatus.

12. The computer readable apparatus of claim 11, wherein the spectrum grant of the at least one of (i) the first type of the generally accessible spectrum, or (ii) the second type of the restricted access spectrum comprises generation of a spectrum grant of the second type of the restricted access spectrum only based on a determination that the interference level is greater than a threshold amount.

13. The computer readable apparatus of claim 11, wherein:

the first type of the generally accessible spectrum comprises quasi-licensed CBRS general authorized access (GAA) spectrum; and the second type of the restricted access spectrum comprises quasi-licensed CBRS priority access licensed (PAL) spectrum.

14. The computer readable apparatus of claim 11, wherein the computerized network apparatus comprises at least one of a Citizens Broadband Radio Service (CBRS) domain proxy (DP) or spectrum allocation system (SAS).

15. A computer readable apparatus comprising at least one non-transitory storage medium, the at least one non-transitory storage medium comprising at least one computer program configured to, when executed on a processing apparatus of a computerized network apparatus, cause the computerized network apparatus to:
  receive, from at least one base station apparatus, data representative of at least one request for location data associated with at least one of a plurality of different wireless cells;
  based on the receipt of the data representative of the at least one request, transmit the location data to the at least one base station apparatus, the location data enabling the at least one base station apparatus to selectively activate one or more sectors; and
  transmit data specifying one of priority access licensed (PAL) or general authorized access (GAA) availability in respective different areas or sectors of individual ones of a plurality of 3rd Generation Partnership Project (3GPP) Long-Term Evolution (LTE) or Fifth Generation New Radio (5G NR) compliant commonly powered small-cells, the data causing the at least one base station apparatus to select radio frequency (RF) carriers for the respective different areas or sectors.

16. The computer readable apparatus of claim 15, wherein the at least one base station apparatus is disposed at a premises of a subscriber of at least one of cable, terrestrial or satellite multiple systems operator (MSO) so as to enable backhaul for wireless local area network wireless local area network (WLAN) or wireline interfaces within the premises.

17. A computerized method of operating a network architecture, the computerized method comprising:
  receiving, from at least one multi-sector base station apparatus, data representative of at least one request for at least one location of at least one of a plurality of different wireless cells;
  receiving second data representative of at least one second request for an availability of power resources;
  based on the receiving of the second data representative of the at least one second request:
    (i) identifying data relating to the availability of power resources;
    (ii) based on the availability of power resources, determining whether a Category A or B operation can be allocated to one or more sectors; and
    (iii) transmitting data relating to the determining of whether the Category A or B operation can be allocated to the one or more sectors to the at least one multi-sector base station apparatus; and
  transmitting data relating to the at least one location to the at least one multi-sector base station apparatus, the data relating to the at least one location enabling the at least one multi-sector base station apparatus to selectively activate the one or more sectors based on the data relating to the determining of whether the Category A or B operation can be allocated to the one or more sectors to the at least one multi-sector base station apparatus.

18. A computerized method of operating a network architecture, the computerized method comprising:
  receiving, from at least one multi-sector base station apparatus, data representative of at least one request for at least one location of at least one of a plurality of different wireless cells;
  based on the receipt of the data representative of the at least one request, transmitting data relating to the at least one location to the at least one multi-sector base station apparatus, the data relating to the at least one location enabling the at least one multi-sector base station apparatus to selectively activate one or more sectors; and
  causing a grant of one or more priority access license (PAL) spectrum allocations for at least one of a CBSD (Citizens Broadband Service Radio Device) or at least one of the one or more sectors having a highest distance in frequency domain from sectors adjacent thereto.

19. The computerized method of claim 18, wherein the granting of the one or more PAL spectrum allocations comprising executing one or more algorithms to determine one or more second sectors adjacent to the one or more sectors and calculate values relating to one or more putative carriers for use by the one or more sectors based on a maximization of the one or more putative carriers from carriers being utilized by the one or more second sectors adjacent to the one or more sectors.

20. The computerized method of claim 18, wherein the receiving of the data representative of the at least one request for the at least one location comprises receiving the data representative of the at least one request for the at least one location based on a determination that a number of random access requests from a plurality of physical cell identities (PCIs) associated with the plurality of different wireless cells, respectively, is higher than a prescribed threshold.

\* \* \* \* \*